(12) United States Patent
Takai et al.

(10) Patent No.: US 10,859,777 B2
(45) Date of Patent: Dec. 8, 2020

(54) PLUG CONNECTOR FOR TRANSCEIVER MODULE, RECEPTACLE ASSEMBLY FOR TRANSCEIVER MODULE, AND TRANSCEIVER MODULE ASSEMBLY

(71) Applicant: YAMAICHI ELECTRONICS CO., LTD., Tokyo (JP)

(72) Inventors: Yosuke Takai, Sakura (JP); Toshiyasu Ito, Togane (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 264 days.

(21) Appl. No.: 15/580,595

(22) PCT Filed: Jun. 8, 2016

(86) PCT No.: PCT/JP2016/067147
§ 371 (c)(1),
(2) Date: Feb. 21, 2018

(87) PCT Pub. No.: WO2016/199831
PCT Pub. Date: Dec. 15, 2016

(65) Prior Publication Data
US 2018/0164519 A1    Jun. 14, 2018

(30) Foreign Application Priority Data

Jun. 9, 2015  (JP) ................................. 2015-116681
Nov. 13, 2015  (JP) ................................. 2015-223501

(51) Int. Cl.
*H01R 24/00* (2011.01)
*G02B 6/42* (2006.01)
(Continued)

(52) U.S. Cl.
CPC ............. *G02B 6/4284* (2013.01); *G02B 6/42* (2013.01); *G02B 6/4245* (2013.01);
(Continued)

(58) Field of Classification Search
CPC .... G02B 6/4284; G02B 6/4245; H01R 12/72; H01R 12/724; H01R 13/64
(Continued)

(56) References Cited

U.S. PATENT DOCUMENTS 3,818,280 A * 6/1974 Smith ................ H01R 12/7005
439/633
5,757,998 A * 5/1998 Thatcher .............. G02B 6/4201
385/75
(Continued)

FOREIGN PATENT DOCUMENTS

JP    H02-172166 A    7/1990
JP    H03-079179 U    8/1991
(Continued)

OTHER PUBLICATIONS

International Search Report issued in PCT/JP2016/067147; dated Sep. 13, 2016.
(Continued)

*Primary Examiner* — Hae Moon Hyeon
(74) *Attorney, Agent, or Firm* — Studebaker & Brackett PC

(57) ABSTRACT

In a transceiver module, when one end portion of a module board (18) is inserted and connected to a concave portion (16R) of a plug connector (16), a projection portion (16PP) formed on the periphery of the concave portion (16R) of the plug connector (16) is fitted into a notch portion (18PH) as one end surface of the module board (18) comes into contact with an inner peripheral surface that forms the concave portion (16R).

8 Claims, 29 Drawing Sheets

(51) Int. Cl.
    *H01R 12/72* (2011.01)
    *H01R 12/70* (2011.01)
    *H01R 12/71* (2011.01)
    *H01R 13/6594* (2011.01)
    *H01R 13/6582* (2011.01)

(52) U.S. Cl.
    CPC ....... *H01R 12/7005* (2013.01); *H01R 12/714* (2013.01); *H01R 12/724* (2013.01); *H01R 12/727* (2013.01); *G02B 6/428* (2013.01); *H01R 13/6582* (2013.01); *H01R 13/6594* (2013.01)

(58) Field of Classification Search
    USPC .......... 439/629, 607.31, 377, 352, 378, 633; 385/88
    See application file for complete search history.

(56) References Cited

U.S. PATENT DOCUMENTS

| | | | | |
|---|---|---|---|---|
| 5,769,668 | A * | 6/1998 | Tondreault | H01R 12/7005 439/326 |
| 5,823,799 | A * | 10/1998 | Tor | H01R 12/7023 439/79 |
| 5,904,581 | A | 5/1999 | Pope et al. | |
| 7,794,241 | B2 * | 9/2010 | Bright | H01R 12/721 439/59 |
| 8,696,389 | B2 * | 4/2014 | Mason | H01R 12/721 439/637 |
| 8,714,839 | B2 * | 5/2014 | Ito | H05K 9/0018 385/139 |
| 9,891,394 | B2 * | 2/2018 | Takai | G02B 6/4284 |
| 2006/0256521 | A1 | 11/2006 | Yee et al. | |
| 2010/0178783 | A1 | 7/2010 | Bright et al. | |
| 2013/0084754 | A1 * | 4/2013 | Mason | H01R 12/716 439/637 |
| 2013/0149906 | A1 | 6/2013 | Kim et al. | |
| 2014/0322960 | A1 * | 10/2014 | Yokoyama | H01R 13/64 439/374 |
| 2014/0335729 | A1 * | 11/2014 | Little | H01R 24/60 439/607.53 |

FOREIGN PATENT DOCUMENTS

| | | |
|---|---|---|
| JP | H04-051780 U | 4/1992 |
| JP | H10-134909 A | 5/1998 |
| JP | 2001-527687 A | 12/2001 |
| JP | 2013-115823 A | 6/2013 |
| WO | 98/02942 A2 | 1/1998 |

OTHER PUBLICATIONS

International Preliminary Report on Patentability and Written Opinion issued in PCT/JP2016/067147; dated Dec. 12, 2017.
An Office Action mailed by the Japanese Patent Office dated Oct. 8, 2019, which corresponds to Japanese Patent Application No. 2015-223501 and is related to U.S. Appl. No. 15/580,595.

* cited by examiner

PLUG CONNECTOR FOR TRANSCEIVER MODULE, RECEPTACLE ASSEMBLY FOR TRANSCEIVER MODULE, AND TRANSCEIVER MODULE ASSEMBLY

TECHNICAL FIELD

The present invention relates to a plug connector for transceiver module, a receptacle assembly for transceiver module, and a transceiver module assembly.

BACKGROUND ART

In an optical communication system, a transceiver module has been put into practical use in order to transmit an optical signal transmitted through optical fibers, a copper cable, and an optical connector or the like to a mother board. The optical communication system has, at the operation-side end face of the housing, transceiver module assemblies that are provided so as to protrude ends of optical modules as transceiver modules of a plurality of transceiver module assemblies, respectively. The transceiver module assembly is configured to include an optical module and an optical module receptacle assembly as disclosed in PATENT DOCUMENT 1, for example. The optical module is configured to mainly include a metal-made upper case and a lower plate forming a contour unit and a module substrate positioned at a predetermined position in a storage space formed between the upper case and the lower plate.

As shown in FIGS. 6A and 6B of PATENT DOCUMENT 1, a plug connector provided with an electrode portion is connected to one end portion of the module board. The electrode portion of the plug connector has a right face and a back face that have a plurality of contact pads arranged to be parallel to one another on a common plane with a predetermined interval, respectively. Two side portions of the one end portion of the module board are position-regulated with regard to the plug connector, respectively, by being inserted and fixed to guide units formed at both side faces of the plug connector. Nibs are formed, respectively, on the two side surface portions of the plug connector, which are continuous with the guide units. Each of the nibs is fixed to the periphery of a groove in a substrate support wall of the upper case.

There has been a demand in recent years for loading as many transceiver modules as possible into a housing of an optical communication system, while the maximum number of transceiver modules are arranged on the entire operation-side end face of the housing of the optical communication system.

CITATION LIST

Patent Document

PATENT DOCUMENT 1: U.S. Pat. No. 8,714,839

SUMMARY OF INVENTION

However, side-by-side arrangement of the transceiver modules of the same design to form one lateral line on the operation-side end face of the housing of the optical communication system has limitations in the number of transceiver modules that can be arranged thereon because a width dimension in the direction of arrangement on the operation-side end face of the housing is set to a prescribed length.

In such a case, a configuration also may be considered in which the number of transceiver modules that can be arranged is increased by reducing the width size along the above-described arrangement direction in the transceiver module. However, the downsizing of the transceiver module is not easy in the case of the structure as described above in which both sides of one end of the module substrate are position-regulated by being inserted and fixed to guide units formed at both side faces of the plug connector, respectively.

In view of the above-described problem, the present invention aims to provide a plug connector for transceiver module, a receptacle assembly for transceiver module, and a transceiver module assembly. The plug connector for transceiver module, a receptacle assembly for transceiver module, and a transceiver module assembly can reduce the width size of a transceiver module assembly in the arrangement direction of a plurality of transceiver modules.

To achieve the above-described object, the plug connector for transceiver module according to the present invention comprises: a connection end having therein a concave portion forming an opening to which one end of a module board is inserted; a plurality of contact terminals that are provided on the outer periphery face of the connection end and that are connected to an electrode portion of the module board; and a positioning portion that is formed in the concave portion of the connection end and that is engaged with a portion to be engaged of one end of the module board to thereby position the contact terminal to the electrode portion of the module board. The positioning portion may be a projection portion fitted to a notch portion formed at the one end of the module board inserted into the concave portion. Alternatively, the positioning portion may be an opening fitted to a projection portion formed at the one end of the module board inserted to the concave portion.

The connection end may include a pair of chamfered portions provided at the tip end side than an end of the contact terminal. Moreover, at least a pair of crush ribs may be provided, which are formed opposite to each other on an upper wall surface portion and a lower wall surface portion forming an upper portion and a lower portion of the concave portion of the connection end, and configured to nip the one end of the module board. A distance between tips of the pair of crush ribs may be set to (A−B−0.15) mm±0.1 mm where A is a thickness of the module board and B is a tolerance thereof, respectively. Moreover, at least a pair of crush ribs may further be provided, which are formed opposite to each other on each side wall surface portions forming both side portions of the concave portion of the connection end, and configured to nip the one end of the module board. A distance between tips of the pair of crush ribs may be set to (C−D−0.15) mm±0.1 mm where C is a lateral width of the module board and D is a tolerance thereof, respectively.

A transceiver module assembly according to the present invention comprises: a module board; and a plug connector for transceiver module including a connection end including therein a concave portion forming an opening into which one end of the module board is inserted, a plurality of contact terminals provided on the outer periphery face of the connection end and that are connected to an electrode portion of the module board; and a positioning portion that is formed in the concave portion of the connection end and that is engaged with a portion to be engaged of one end of the module board to thereby position the contact terminal to the electrode portion of the module board, wherein the electrode portions of the module board are formed at a position away from an end surface of the one end than a position of the portion to be engaged is.

A receptacle assembly for transceiver module according to the present invention comprises: a connector connected to a transceiver module; and a receptacle cage including a module accommodating portion including a module slot provided at one end and configured to allow passage of the transceiver module, where the module accommodating portion is configured to attachably and detachably accommodate the transceiver module, a connector accommodating portion communicating with the module accommodating portion and being configured to accommodate the connector, and a stopper piece provided at the module accommodating portion and configured to guide the transceiver module in a first attitude being inserted into the module accommodating portion, and when the transceiver module in a second attitude inverted from the first attitude is inserted into the module accommodating portion, to restrict an insertion operation of the transceiver module.

A transceiver module assembly according to the present invention comprises: a transceiver module including the above-described plug connector for transceiver module; and a receptacle assembly for transceiver module including a connector connected to the transceiver module, and a receptacle cage including a module accommodating portion including a module slot provided at one end and configured to allow passage of the transceiver module, where the module accommodating portion is configured to attachably and detachably accommodate the transceiver module, a connector accommodating portion communicating with the module accommodating portion and being configured to accommodate the connector, and a stopper piece provided at the module accommodating portion and configured to guide the transceiver module in a first attitude being inserted into the module accommodating portion, and when the transceiver module in a second attitude inverted from the first attitude is inserted into the module accommodating portion, to restrict an insertion operation of the transceiver module.

Moreover, a receptacle assembly for transceiver module according to the present invention comprises: a connector connected to a transceiver module; and a receptacle cage including a module accommodating portion including a module slot provided at one end and configured to allow passage of the transceiver module, where the module accommodating portion is configured to attachably and detachably accommodate the transceiver module, and a connector accommodating portion communicating with the module accommodating portion and being configured to accommodate the connector. The receptacle cage may include a pair of projection portions located at positions adjacent to a lock piece to be selectively engaged with a fixing piece of a release lever of the transceiver module, and configured to come into contact with a neighborhood of the fixing piece of the release lever of the inserted transceiver module.

The transceiver module assembly according to the present invention may include: a transceiver module including the above-described transceiver module assembly, and a housing configured to accommodate the transceiver module assembly; and a receptacle assembly for transceiver module including a connector connected to the transceiver module, and a receptacle cage including a module accommodating portion including a module slot provided at one end and configured to allow passage of the transceiver module, where the module accommodating portion is configured to attachably and detachably accommodate the transceiver module, a connector accommodating portion communicating with the module accommodating portion and being configured to accommodate the connector, and a stopper piece provided at the module accommodating portion and configured to guide the transceiver module in a first attitude being inserted into the module accommodating portion, and when the transceiver module in a second attitude inverted from the first attitude is inserted into the module accommodating portion, to restrict an insertion operation of the transceiver module. The housing of the transceiver module may include a terminal run off provided at an end portion opposed to the connector and is away from the contact terminals in the connector when the housing is connected to the connector.

According to the plug connector for transceiver module, the receptacle assembly for transceiver module, and the transceiver module assembly of the present invention, the positioning portion is formed in the concave portion of the connection end and is engaged with the portion to be engaged of the one end of the module substrate, thereby positioning the contact terminal to the electrode portion of the module substrate. Because this is in no need of a guide unit used in a conventional structure, the transceiver module assembly can have a reduced width size along the arrangement direction in a plurality of transceiver modules.

DESCRIPTION OF EMBODIMENTS

Figure 11:
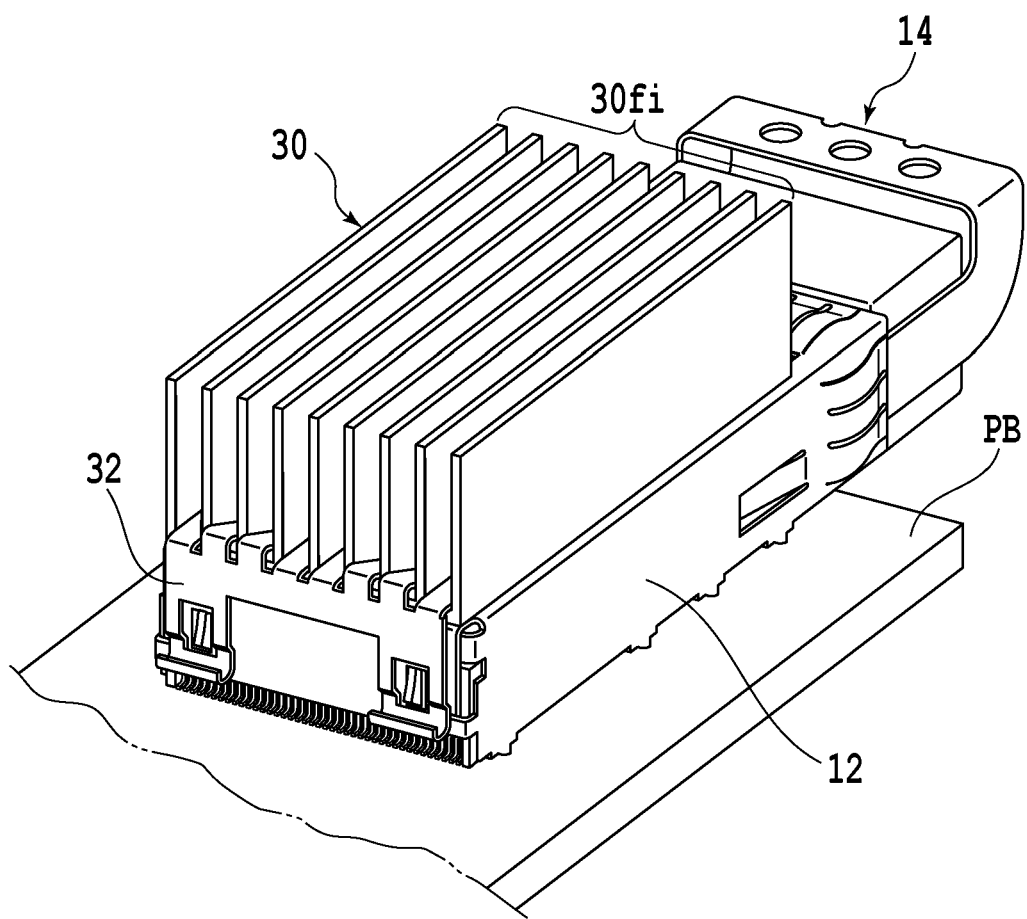
FIG. 11 is a perspective view showing an example of a transceiver module assembly according to the present invention.

FIG. 11 shows an example of a transceiver module assembly according to the present invention together with a printed wiring board PB.

Although illustration is omitted, a plurality of transceiver module assemblies to be described later are arranged laterally in a line or in a matrix at given intervals, for example, on an operation side end face of a housing that the transceiver module assemblies is placed. End portions of optical modules, each of which represents an example of a transceiver module of each transceiver module assembly, project from the operation side end face of the housing, respectively. A connector, to which one end of e.g. an optical cable or of a copper cable is connected, is connected to a port provided at the end portion of each optical module. In the case of the optical cable, the other end of the optical cable is connected to an optical connector of an another housing that constitutes a communication system, not-illustrated.

Transceiver module assembly comprises, as its main elements: an optical module 14 (see FIGS. 16 and 17) as the example of the transceiver module to be described later; a receptacle assembly for optical module; and a heatsink 30 (See FIG. 11).

Figure 16:
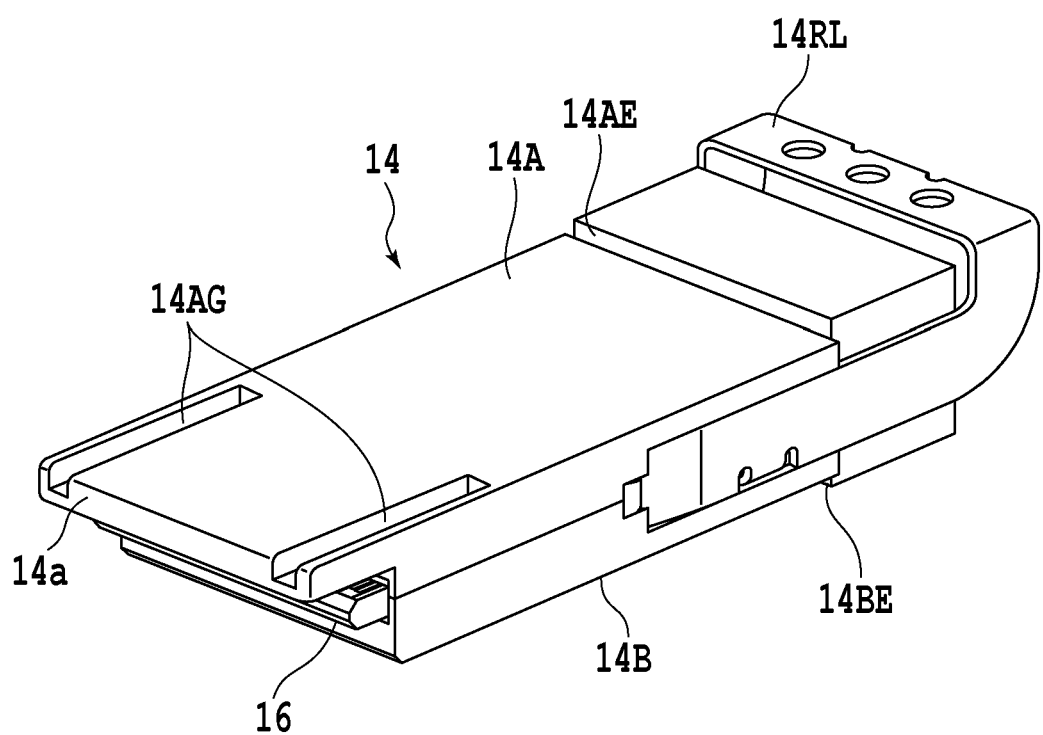
FIG. 16 is a perspective view showing an example of an optical module used in the transceiver module assembly according to the present invention when seen from above.
Figure 17:
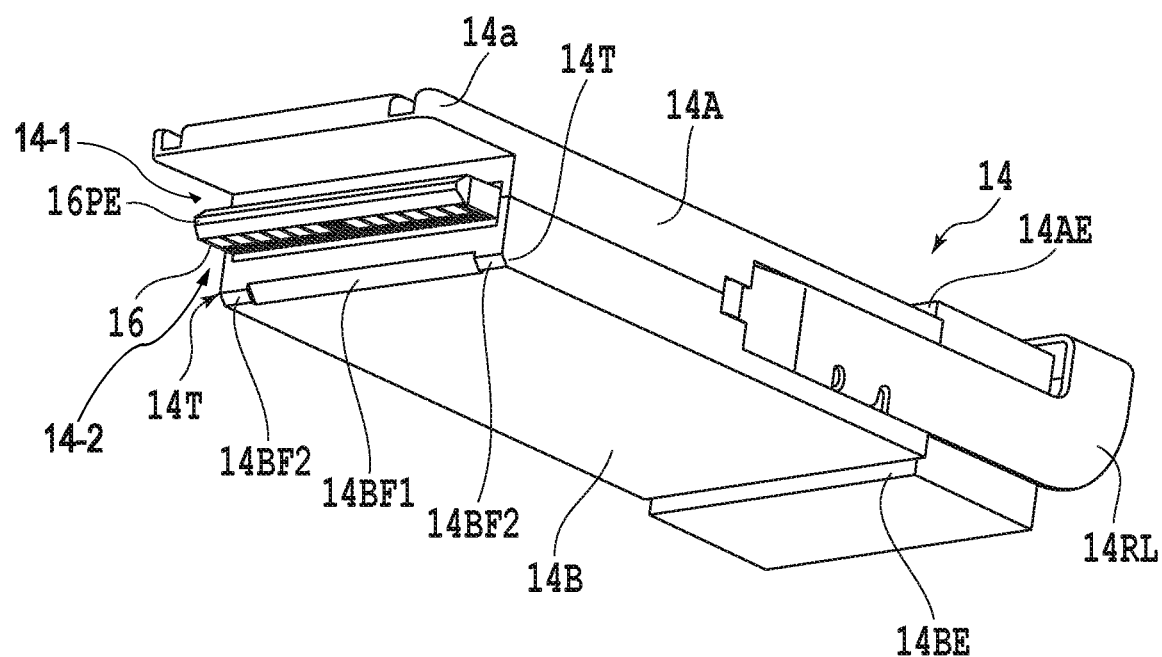
FIG. 17 is a perspective view showing an example of the optical module used in the transceiver module assembly according to the present invention when seen from below.

As shown in FIGS. 16 and 17, the optical module 14 is configured to comprise, as its main elements: an upper case 14A and a lower case 14B made of a metal and constituting a contour unit; and a module board 18 as well as a plug connector 16 (see FIG. 2) positioned at prescribed positions in a storage space defined between the upper case 14A and the lower case 14B.

A protection wall 14a in a thin sheet shape, which is continuous with an upper surface of the upper case 14A and projects in a longitudinal direction, is formed on one end portion of the upper case 14A. The protection wall 14a is configured to protect the plug connector 16 to be described later in case the optical module 14 is dropped by mistake. A pair of grooves 14AG, each of which has a prescribed length to be engaged with a corresponding one of stopper pieces 12RST and 12LST of a receptacle for optical module to be described later, are formed with a given interval on one end of the upper surface of the upper case 14A. Moreover, the other end side of the upper surface of the upper case 14A is provided with a stepped portion 14AE, which comes into contact with an open end portion of a receptacle cage 12 when the optical module 14 is inserted into the receptacle cage 12. Likewise, the other end side of a lower surface of the lower case 14B is provided with a stepped portion 14BE, which comes into contact with the open end portion of the receptacle cage 12 when the optical module 14 is inserted into the receptacle cage 12. As shown in FIG. 17, a first inclined surface portion 14BF1 serving as a terminal run off is formed at a corner portion that is provided at a position on the lower case 14B located immediately below the protection wall 14a of the upper case 14A. A lateral width of the first inclined surface portion 14BF1 extending along a short side of the lower case 14B is set smaller than a lateral width of the plug connector 16. Moreover, very small projection portions 141 are formed at both ends of the first inclined surface portion 14BF1, respectively. Each projection portion 141 serving as a protection wall for the plug connector has a second inclined surface portion 14BF2 which is smaller than the first inclined surface portion 14BF1. Hereby, when the optical module 14 is connected to a host connector 22 to be described later as shown in the enlarged view of FIG. 18, a distance L1 from the first inclined surface portion 14BF1 to fixed terminals of a plurality of signal contact terminals 28ai opposed thereto is set greater than a distance L2 from the second inclined surface portions 14BF2 to the fixed terminals of the plurality of grounding contact terminals 28ai opposed thereto. Degradation in characteristics of a signal to be transmitted at a relatively high frequency band is avoided by setting the aforementioned distance L1 as described above.

A latch mechanism is provided at the other end portion of the upper case 14A. The latch mechanism comprises a release lever 14RL. When the release lever 14RL is moved in a predetermined direction by pulling an end portion thereof, a fixing piece of the release lever 14RL is unlocked by being detached from a lock piece 12LF of the receptacle cage 12 to be described later. Moreover, when the release lever 14RL is moved in the reverse direction to the aforementioned direction, the fixing piece of the release lever 14RL fixes on the lock piece 12LF of the receptacle cage 12 to be described later. Herewith, the optical module 14 is locked with the receptacle cage 12.

Although illustration is omitted, a plurality of ports to which the optical connectors are connected are formed on the other end surfaces of the upper case 14A and the lower case 14B.

Figure 1:
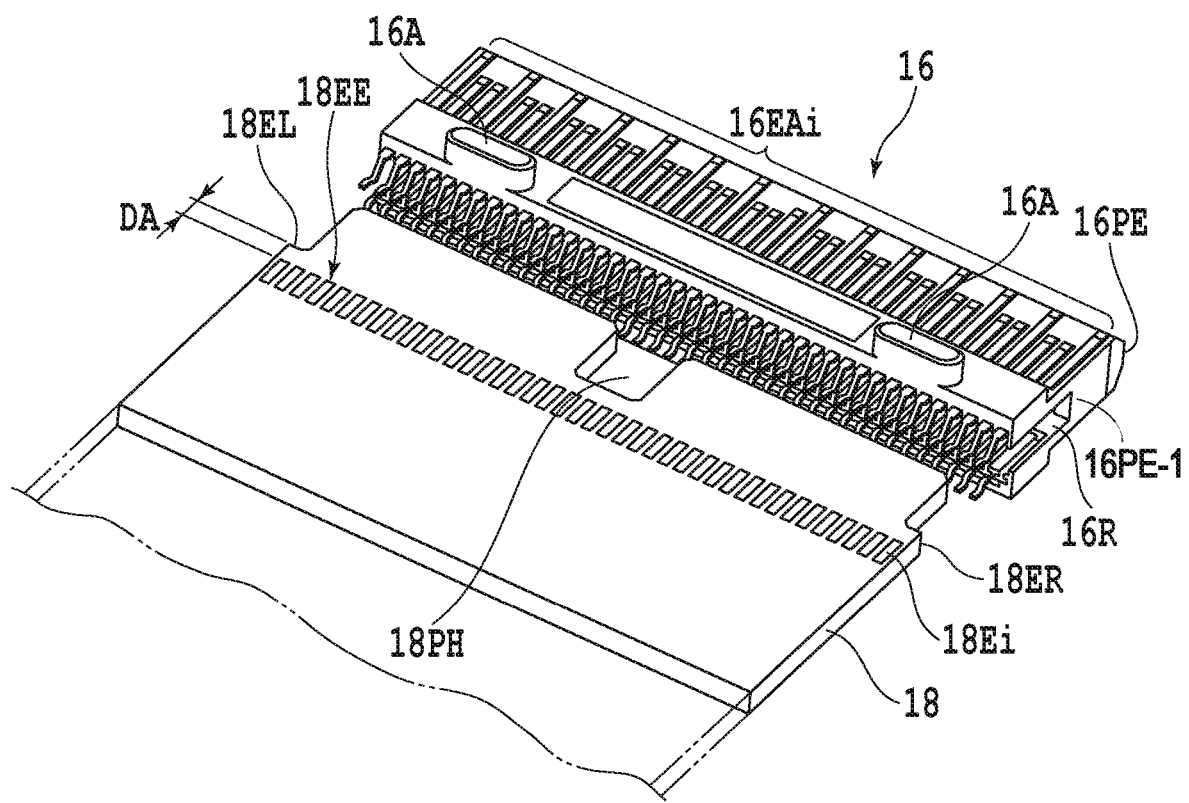
FIG. 1 is an enlarged perspective view showing an example of a plug connector for transceiver module according to the present invention together with a module board.
Figure 2:
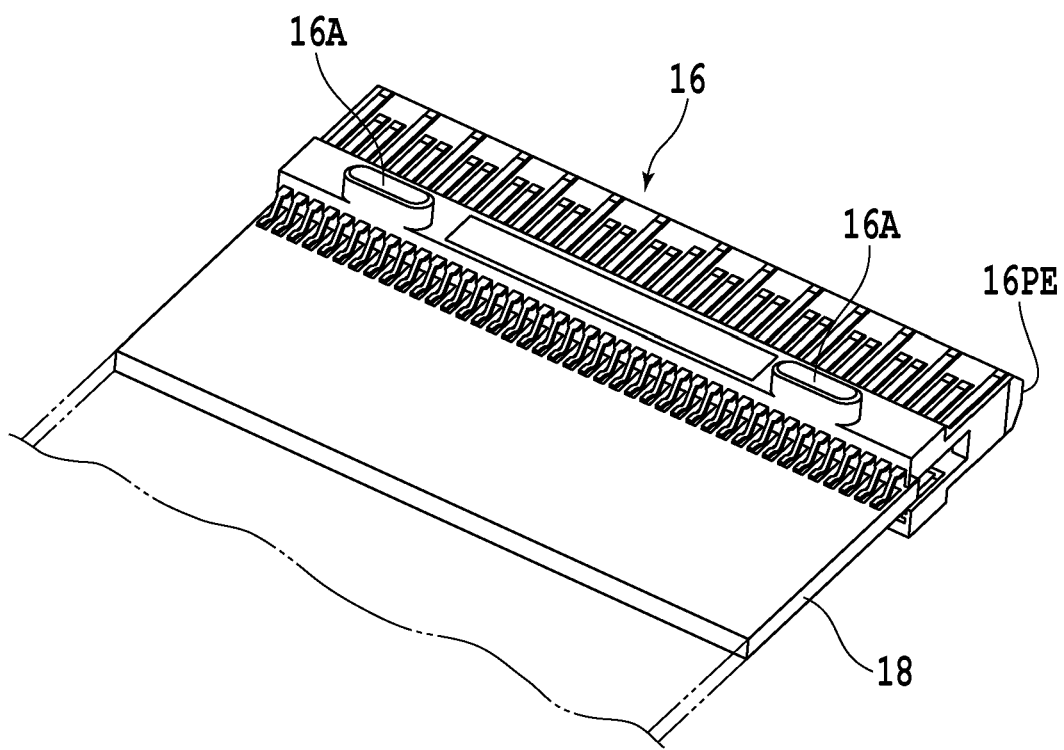
FIG. 2 is an enlarged perspective view showing an example of the plug connector for transceiver module according to the present invention together with the module board connected thereto.

As shown in the enlarged view of FIG. 2, one end portion of the module board 18 serving as a connection end of the module board 18 is inserted into and connected to the inner side of the plug connector 16. As shown in the enlarged view of FIG. 1, a substantially-central part in the one end portion of the module board 18 is provided with a notch portion (a groove portion) 18PH serving as a positioning portion of the module board 18 relative to the plug connector 16. An open end of the notch portion 18PH is opposed to a projection portion 16PP in the plug connector 16 to be described later, and penetrates through the one end of the module board 18. Clearances 18ER and 18EL are formed at the both sides portions in the one end portion of the module board 18, respectively. At a position away from the closed end of the notch portion 18PH of the module board 18 by a predetermined distance DA, electrode portions 18EE that comprise a plurality of contact pads 18Ei (i=1n, n is a positive integer) and that are opposed to the right face, which is shown, and the back face, which is underneath and not shown. The contact pads 18Ei are arranged in a line along a direction substantially orthogonal to the insertion direction to the plug connector 16 of the module board 18 with a predetermined interval (e.g., 0.5 mm interval).

The plug connector 16 is integrally molded by using a resin material, for example, and as shown in the enlarged view of FIG. 1, is configured to comprise a connection end 16PE, a board support portion 16PE-1 being continuous with the connection end 16PE and supporting the one end portion of the module board 18, and a plurality of contact terminals 16EAi and 16EBi (i=1 to n, n is a positive integer) supported by the connection end 16PE and the board support portion 16PE-1.

Figure 6:
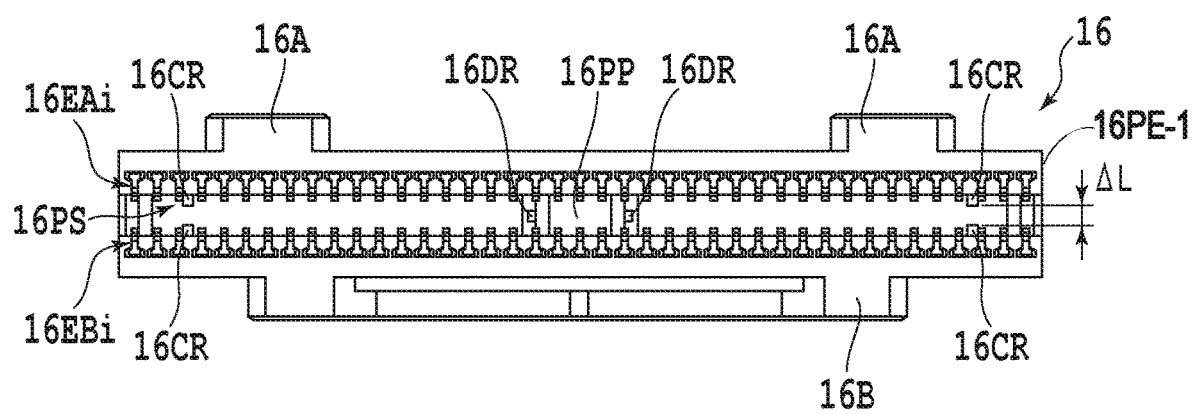
FIG. 6 is a rear view of the example shown in FIG. 4.

As shown in FIG. 17, the connection end 16PE protrudes from the opening end portions 14-1 and 14-2 of the upper case 14A and the lower case 14B, and is inserted into a slot of the host connector 22 to be described later. As shown in the enlarged view of FIG. 3, the connection end 16PE has therein a concave portion 16R to which the one end of the above-described module board 18 is inserted. As shown in FIG. 6, the concave portion 16R communicates with an open end portion 16PS of the board support portion 16PE-1. Moreover, both side portions in the concave portion 16R are outwardly opened. At a closed end portion forming part of the concave portion 16R, the projection portion 16PP is formed at a substantially central position that corresponds to the notch portion 18PH of the module board 18. The projection portion 16PP and the notch portion 18PH functioning as the positioning portions are set in advance such that the respective contact terminals 16EAi and 16EBi correspond to the prescribed contact pads 18Ei. Moreover, as shown in FIG. 6, pairs of crush ribs 16CR are formed at two locations away from the projection portion 16PP toward two side portions in the concave portion 16R in order to pinch and position the ends of the module board 18 so as to maintain the posture of the module board 18 to be parallel to the upper face of the connection end 16PE. Each pair of crush ribs 16CR opposed to each other extend straight and continuously along the side portions for a predetermined length from the open end portion 16PS to the closed end portion of the concave portion 16R, for example. Each crush rib 16CR is formed in such a way as to bulge from a wall surface portion forming an upper surface in the vicinity of the corresponding side portion of the concave portion 16R or from a wall surface portion forming a lower surface of the concave portion 16R. It should be noted that the respective crush ribs 16CR may be formed dividedly. For instance, in FIG. 6, a distance ΔL between tips of the crush ribs 16CR is set to (A−B−0.15) mm±0.1 mm assuming that A is a thickness of the module board 18 and B is a tolerance thereof, respectively. More specifically, when the thickness of the module board 18 is 1.0 mm±0.1 mm, the distance ΔL is set to 0.73 mm±0.1 mm, for example, so as to crush a portion of the module board 18. Moreover, the thickness of the module board 18 is set to 1.3 mm±0.1 mm.

Figure 3:
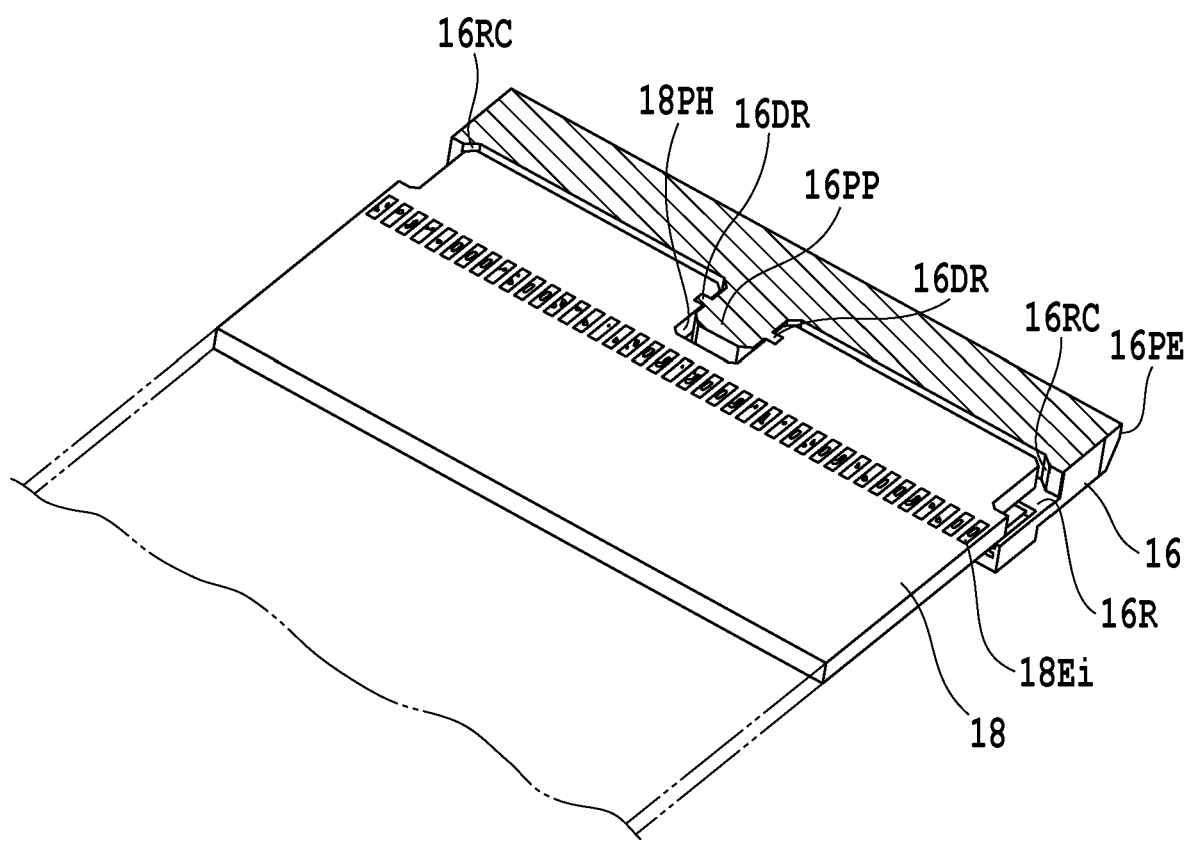
FIG. 3 is a cross-sectional view of the example shown in FIG. 2.

It should be noted that, a pair of crush ribs 16DR to perform position regulation of the periphery of the open end of the notch portion 18PH of the module board 18 may be formed opposite to fitting portions of the projection portion 16PP as shown in FIGS. 3 and 6. In addition, the crush ribs 16DR may extend to the above-described closed end portion, in such a way as to be integrated together without being located away from the closed end portion mentioned above that intersects the fitting portions.

Furthermore, although the pairs of the crush ribs 16CR are formed away from each other at the two positions, the crush ribs is not limited to this example. For instance, another pair of crush ribs 16CR may be additionally formed at least at one or more position between the pairs of crush ribs 16CR at the two positions.

Figure 4:
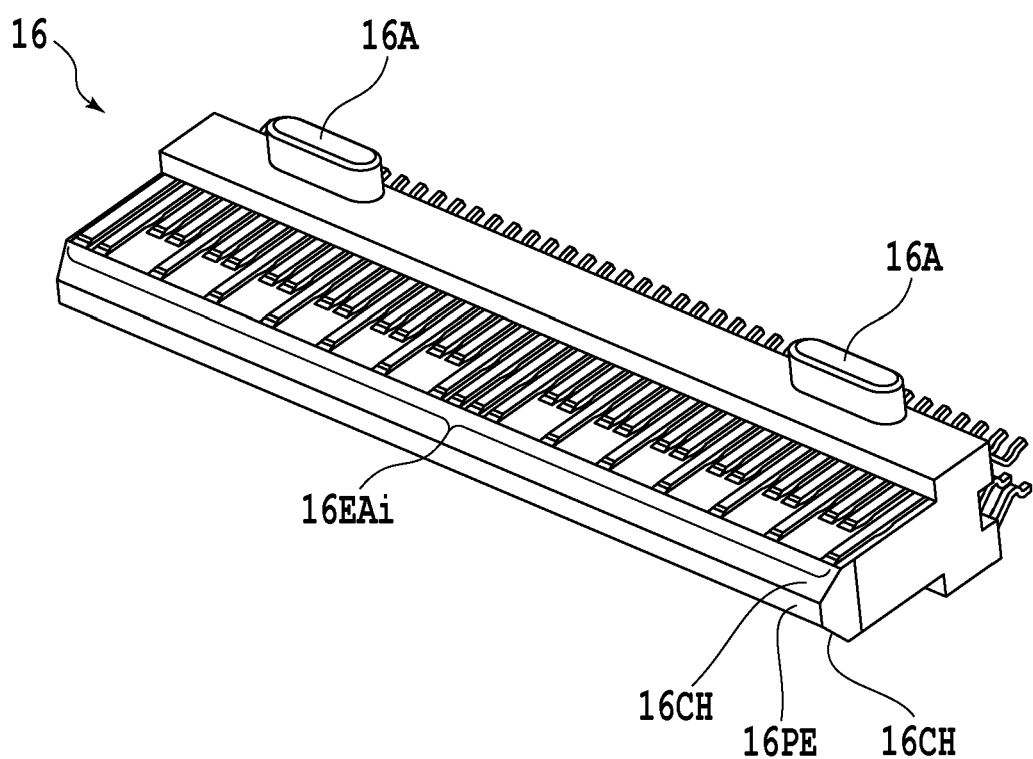
FIG. 4 is a perspective view showing the external appearance of an example of the plug connector for transceiver module according to the present invention when seen from above.

Both side surfaces of the connection end 16PE are placed on planes that are common to both side surfaces of the module board 18, respectively. As shown in the enlarged view of FIGS. 4 and 5, the connection end 16PE has, at the tip end of the outer periphery thereof, a pair of chamfers 16CH that are formed along the arrangement direction of the contact terminals 16EAi and 16EBi from one side face to the other side face, the pair of chamfers 16CH functioning as a guide for the plug connector 16 into the slot of the above-described host connector 22. The chamfer 16CH is set to about C 0.5, for example. A predetermined chamfer smaller than the chamfer 16CH is provided at both side faces at the outer periphery of the connection end 16PE. This allows the tip end of the connection end 16PE to have a substantially acute arch-like cross sectional shape. Thus, because there is no need to form a chamfered portion for leading the plug connector 16 at the periphery of the slot of the host connector 22, this allow the dimension of the plug connector 16 in the host connector 22 along the attachment/detachment direction to be reduced correspondingly.

Figure 5:
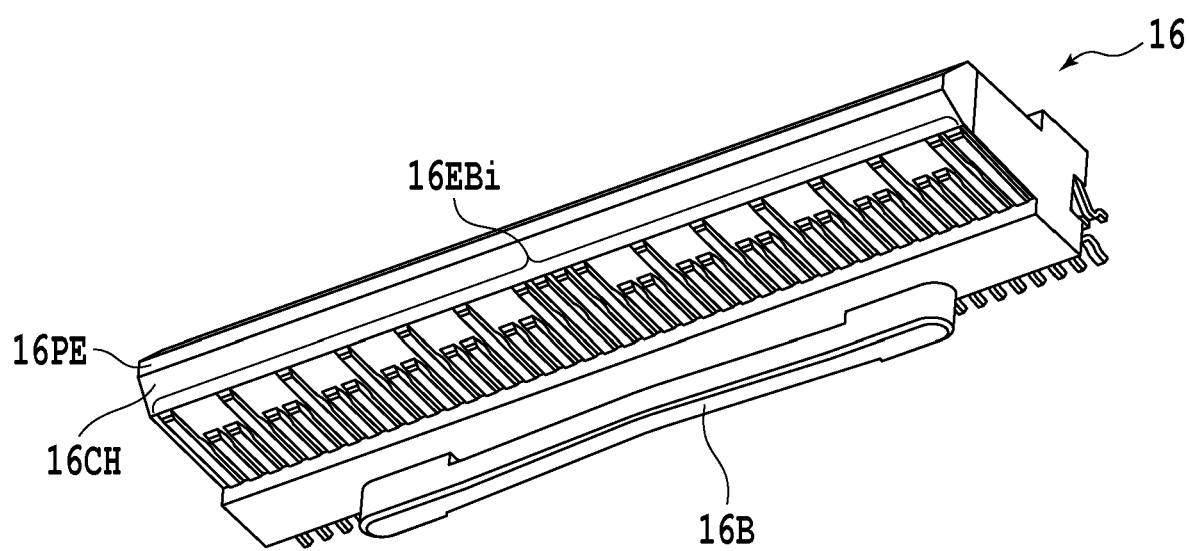
FIG. 5 is a perspective view showing external appearance of an example of the plug connector for transceiver module according to the present invention when seen from below.

As shown in the enlarged view of FIG. 6, the board support portion 16PE-1 of the plug connector 16 has the open end portion 16PS through which one end of an inserted module board 18 passes. A pair of positioning portions 16A to come into contact with board support walls (not shown) inside the upper case 14A and the lower case 14B are formed away from each other on an upper surface of the board support portion 16PE-1. Moreover, as shown in FIGS. 5 and 6, an elongated spring portion 16B that comes into contact with the board support walls (not shown) inside the upper case 14A and the lower case 14B is formed on a lower surface of the board support portion 16PE-1. Spring stiffness of the elongated spring portion 16B is set in a range from 10.0 to 25.0 (N/mm), for example.

The contact terminals 16EAi are placed on the upper surface of the connection terminal portion 16PE, which is opposed to the pair of positioning portions 16A of the board support portion 16PE-1 with given intervals corresponding to the above-described contact pads 18Ei. The contact terminals 16EAi comprise power source terminals, signal contact terminals, and grounding contact terminals, for example. For instance, a pair of the signal contact terminals adjacent to each other are placed between the grounding contact terminals. The contact terminal 16EAi has a fixed terminal portion to be solder-fixed to the corresponding contact pad 18Ei, and a contact portion to come into contact with a contact portion of a corresponding contact terminal of the host connector 22.

The contact terminals 16EBi are placed on the lower surface of the connection terminal portion 16PE, which is opposed to the spring portion 16B of the board support portion 16PE-1 to have predetermined intervals corresponding to the above-described contact pads 18Ei. The contact terminals 16EBi comprise power source terminals, signal contact terminals, and grounding contact terminals, for example. For instance, a pair of the signal contact terminals adjacent to each other are placed between the grounding contact terminals. The contact terminal 16EBi has a fixed terminal portion to be solder-fixed to the corresponding contact pad 18Ei and a contact portion to come into contact with a contact portion of the corresponding contact terminal of the host connector 22.

In the above-described configuration, where the one end portion of the module board 18 is inserted and connected to the concave portion 16R of the plug connector 16 as shown in the enlarged view of FIG. 3, and when one end face of the module board 18 is touched to the inner periphery face forming the concave portion 16R, the projection portion 16PP formed at the periphery of the concave portion 16R of the plug connector 16 is fitted to the notch portion 18PH. At that time, both ends on the one end surface of the module board 18 are engaged with arc portions 16RC of the concave portion 16R. Hereby, the contact terminals 16EAi and 16EBi are positioned to the respective contact pads 18Ei on the module board 18. Accordingly, because the module board 18 is in no need of a guide portion conventionally used in the structure of a plug connecter, this can result in a reduced width size along the arrangement direction of the contact terminals 16EAi and 16EBi in the plug connector 16.

Moreover, in the above-described example, the notch portion (the groove portion) 18PH is formed as the positioning portion relative to the plug connector 16 of the module board 18, and the projection portion 16PP is formed at the periphery of the concave portion 16R of the plug connector 16. However, the present invention is not limited only to this example. For instance, a projection portion serving as a positioning portion relative to the plug connector 16 of the module board 18 may be formed and an opening to be fitted with the projection portion may be formed at the periphery of the concave portion 16R of the plug connector 16.

Figure 7A:
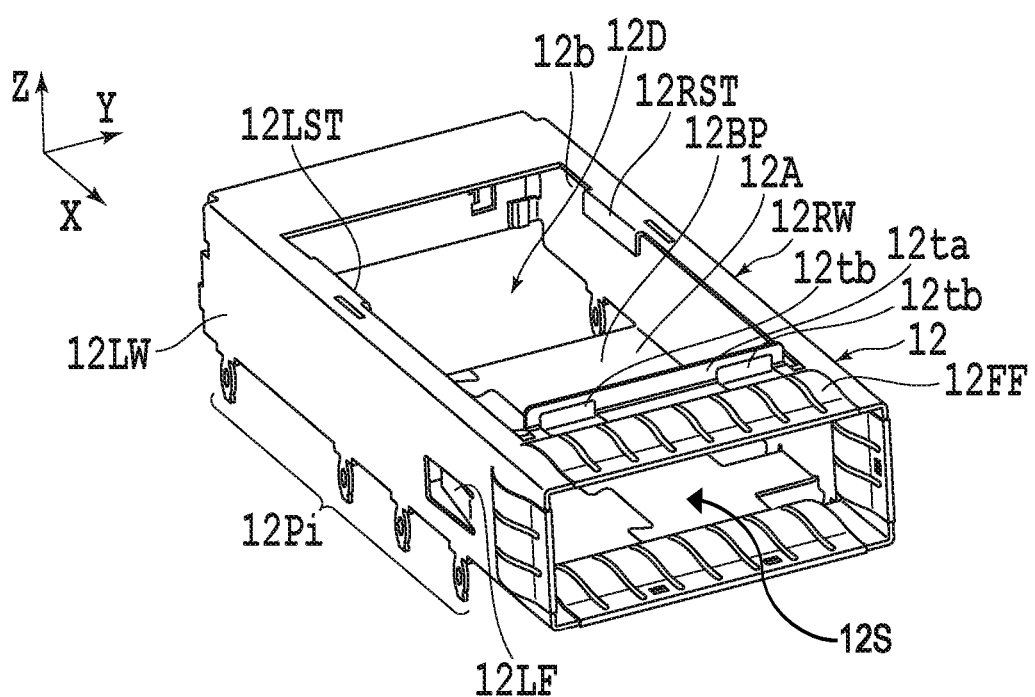
FIG. 7A is a perspective view showing a receptacle cage used in an example of a receptacle assembly for transceiver module according to the present invention.

As shown in FIG. 7A, the receptacle assembly for optical module as an example of a receptacle assembly for transceiver module according to the present invention comprises, as its main elements: the receptacle cage 12 provided on the printed wiring board PB and configured to attachably and detachably accommodate the above-described optical module 14; and the host connector 22 (see FIG. 9) to be accommodated in a host connector accommodating portion 12D of the receptacle cage 12.

The receptacle cage 12 is formed by press work on a thin sheet of stainless steel or phosphor bronze, for example, or preferably by use of stainless steel having good thermal conductivity. The receptacle cage 12 includes a module accommodating portion 12A and the host connector accommodating portion 12D which are provided inside.

The module accommodating portion 12A is formed by being surrounded by side walls 12RW and 12LW that are opposed to each other with a given interval therebetween, and a bottom wall portion 12BP thereof. The side walls 12RW and 12LW extend along the X coordinate axis in the orthogonal coordinates in FIG. 7A, that is, along a direction of attachment and detachment of the optical module 14. Each of the side walls 12RW and 12LW includes a lock piece 12LF in the vicinity of a module slot 12S to be described later. Each lock piece 12LF is selectively engaged with the fixing piece of the release lever 14RL of the optical module 14 described above in such a way as to establish the locked state of the above-described optical module 14 with the module accommodating portion 12A.

The module slot 12S that is open in the direction of the X coordinate axis is provided to one end of the module accommodating portion 12A, whereby the optical module 14 is attached and detached through the module slot 12S. A front electromagnetic interference (EMI) finger portion 12FF in a tubular shape serving as a shield member is provided on the entire periphery of the module slot 12S having a substantially rectangular cross section. An inner peripheral part of the front EMI finger portion 12FF comes into contact with an outer peripheral part of the optical module 14 to be inserted, while an outer peripheral part of the front EMI finger portion 12FF comes into contact with the periphery of each opening provided in the operation side end face of the housing of the communication system, for example. In this way, when the receptacle cage 12 is press-fitted into the opening of the housing, a gap between the opening of the housing and the outer peripheral part of the receptacle cage 12 is shielded by the front EMI finger portion 12FF made of a metal. As a consequence, noise is confined to the inside of the housing, and the noise is unlikely to leak out through a gap between the outer peripheral part of the optical module 14 and an inner peripheral part of the module accommodating portion 12A.

The stopper pieces 12RST and 12LST each having a substantially L-shaped cross section are integrally formed at given positions on inner peripheral surfaces of the side walls 12RW and 12LW of the module accommodating portion 12A, respectively.

Moreover, another end of the module accommodating portion 12A, which is opposed to the module slot 12S, communicates with the inside of the host connector accommodating portion 12D. A substantially rectangular opening 12b that is open along the Z coordinate axis is formed at a portion opposed to the bottom wall portion 12BP. The stopper pieces 12RST and 12LST protrude inward and downward from the periphery of the opening 12b. In this way, a distance between the stopper pieces 12RST and 12LST opposed to each other becomes smaller than the corresponding distance of the opening 12b.

On the periphery of the opening 12b, a pair of hook portions 12ta to selectively hold a pair of fixing pieces (see FIG. 13) of a heatsink holder 32 to be described later are integrally formed on the receptacle cage 12. The pair of hook portions 12ta include lock holes 12tb in a line along a direction of the Y coordinate axis with a given interval corresponding to an interval of the pair of fixing pieces mentioned above.

End portions on both of short sides of the bottom wall portion 12BP, which connects lower ends of the side walls 12RW and 12LW to each other, are in contact with a surface of the printed wiring board PB. Press-fitting nibs 12Pi (i=1 to n, n is a positive integer) are formed at given intervals on both of long sides of the bottom wall portion 12BP, respectively. Each press-fitting nib 12Pi is press-fitted into a corresponding one of pores (not shown) formed in the surface of the printed wiring board PB in conformity with the arrays of the press-fitting nibs 12Pi. Thus, a lower end surface of the receptacle cage 12 is closely fixed to the surface of the printed wiring board PB.

The host connector accommodating portion 12D which is open toward the surface of the printed wiring board PB is formed by being surrounded by a host connector side closed end portion opposed to the module slot 12S of the receptacle cage 12, an upper surface constituting the periphery of the opening 12b on the host connector side, and host connector side portions of the side walls 12RW and 12LW.

Figure 8:
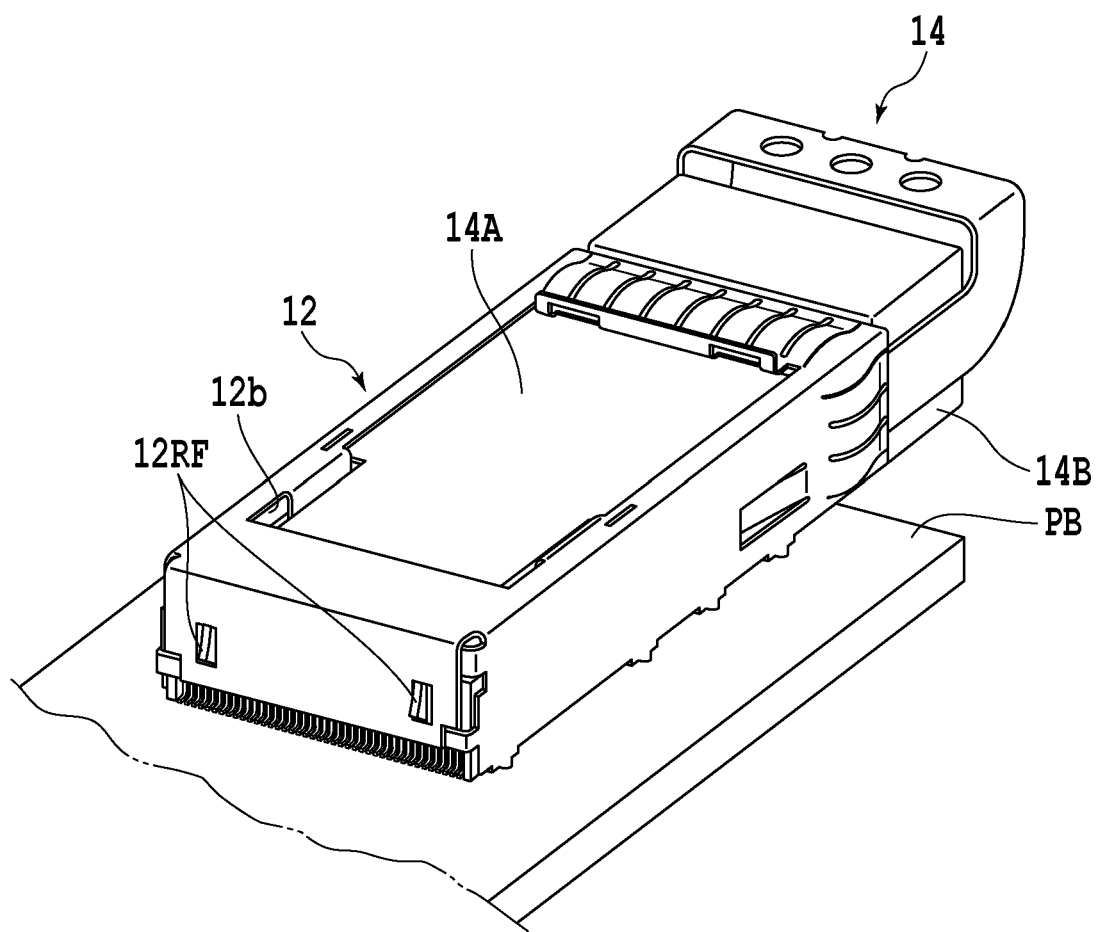
FIG. 8 is a perspective view showing an example of the receptacle assembly for transceiver module according to the present invention together with an optical module and a printed wiring board.

As shown in FIG. 8, on an outer peripheral part of the host connector side closed end portion, a pair of hook members 12RF to lock a pair of fixing portions of the heatsink holder 32 to be described later are formed integrally with the receptacle cage 12. An opening is formed on the periphery of each hook member 12RF.

Figure 9:
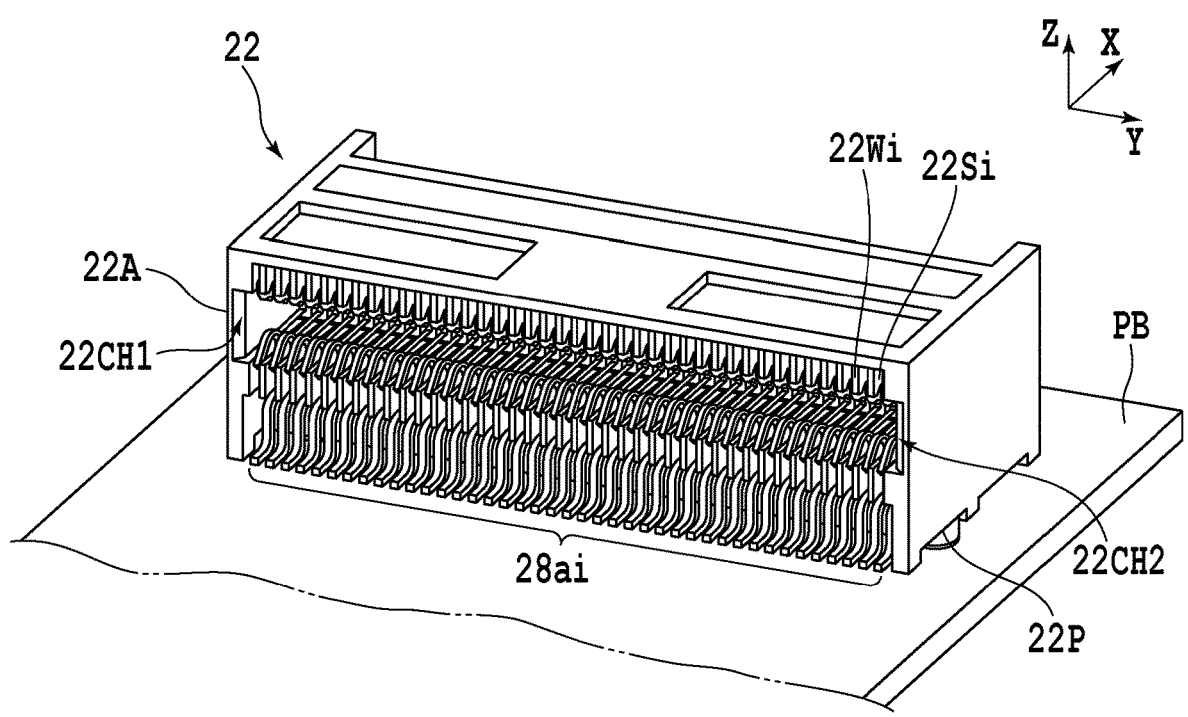
FIG. 9 is a perspective view showing a host connector used in an example of the receptacle assembly for transceiver module according to the present invention.
Figure 15:
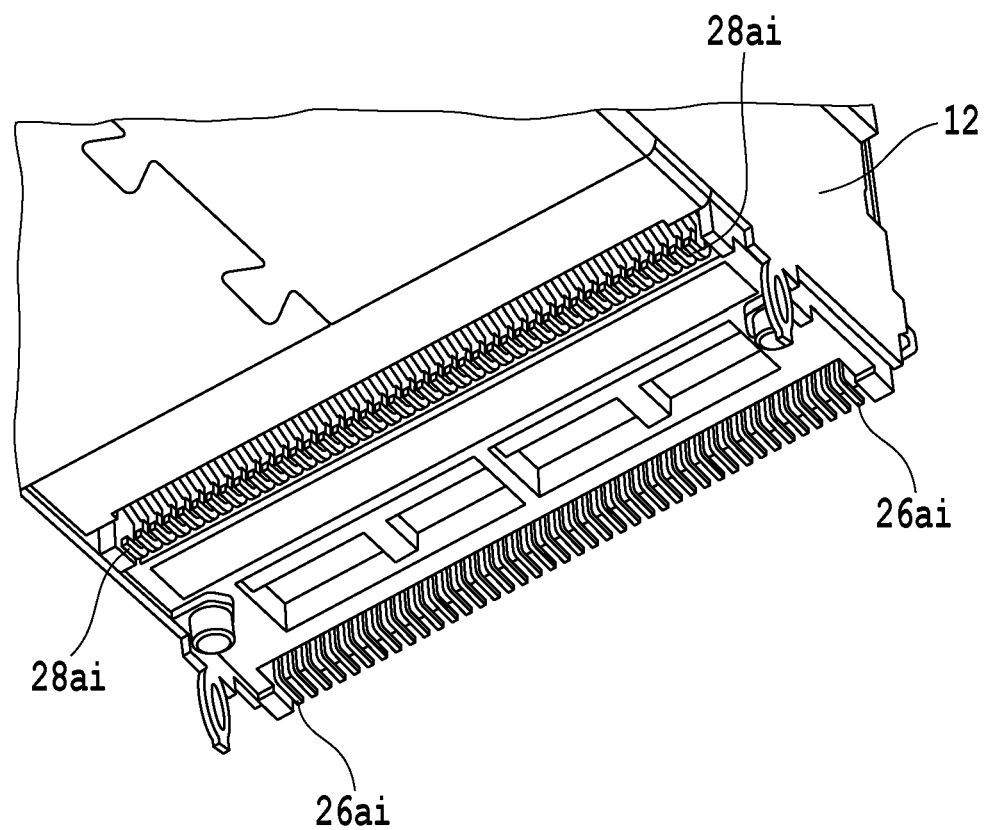
FIG. 15 is a partial enlarged perspective view of a portion in FIG. 14.
Figure 18:
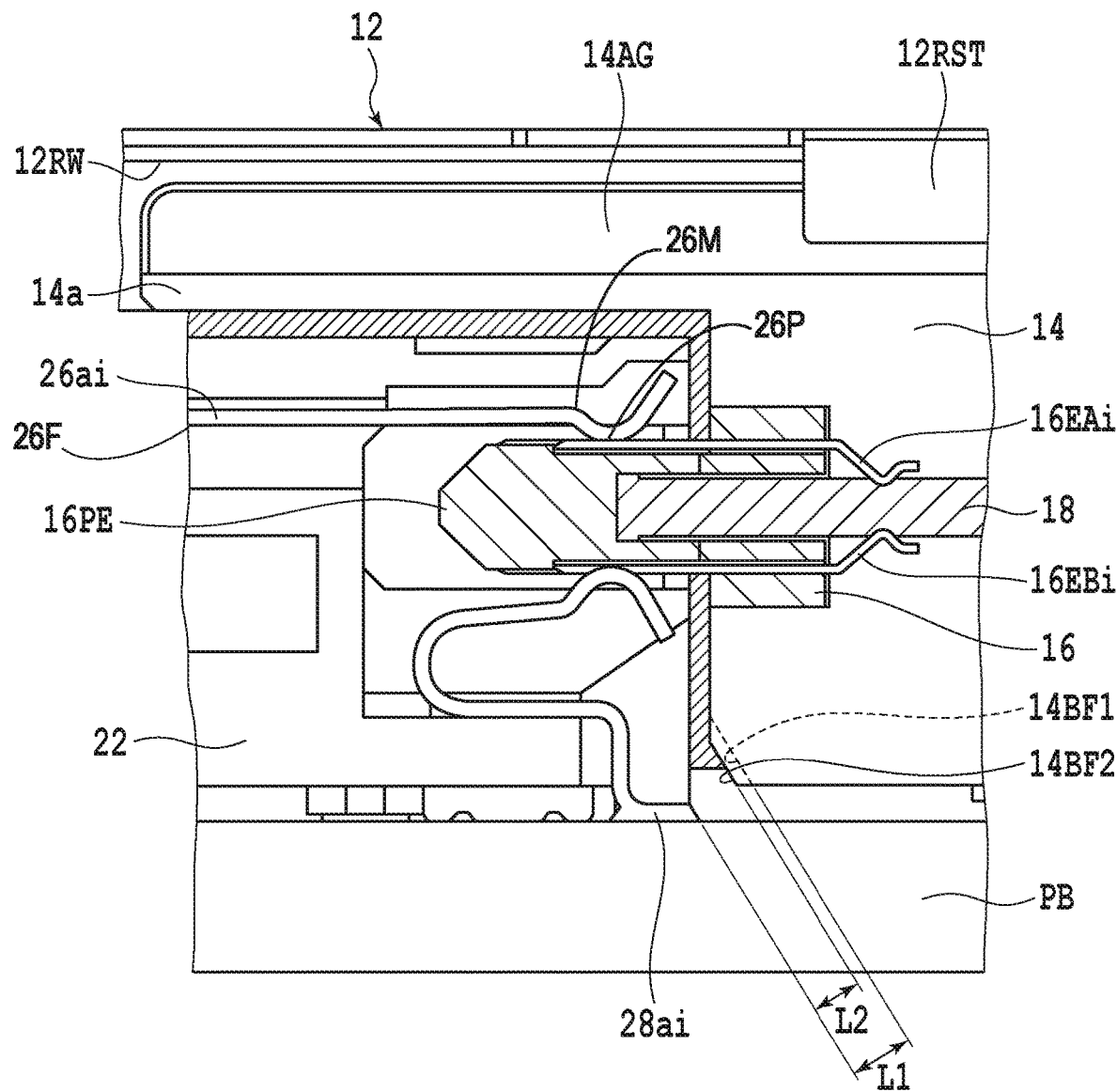
FIG. 18 is a partial cross-sectional view showing a partial enlarged view of a state in which a plug connector of the optical module used in the transceiver module assembly according to the present invention is connected to a host connector.

As shown in FIG. 9, the host connector 22 includes a connector insulator provided with a slot 22A that allows attachable and detachable insertion of the plug connector 16 of the optical module 14, and a plurality of contact terminals 26ai and 28ai (i=1 to n, n is a natural integer) (see FIGS. 15 and 18).

Figure 21A:
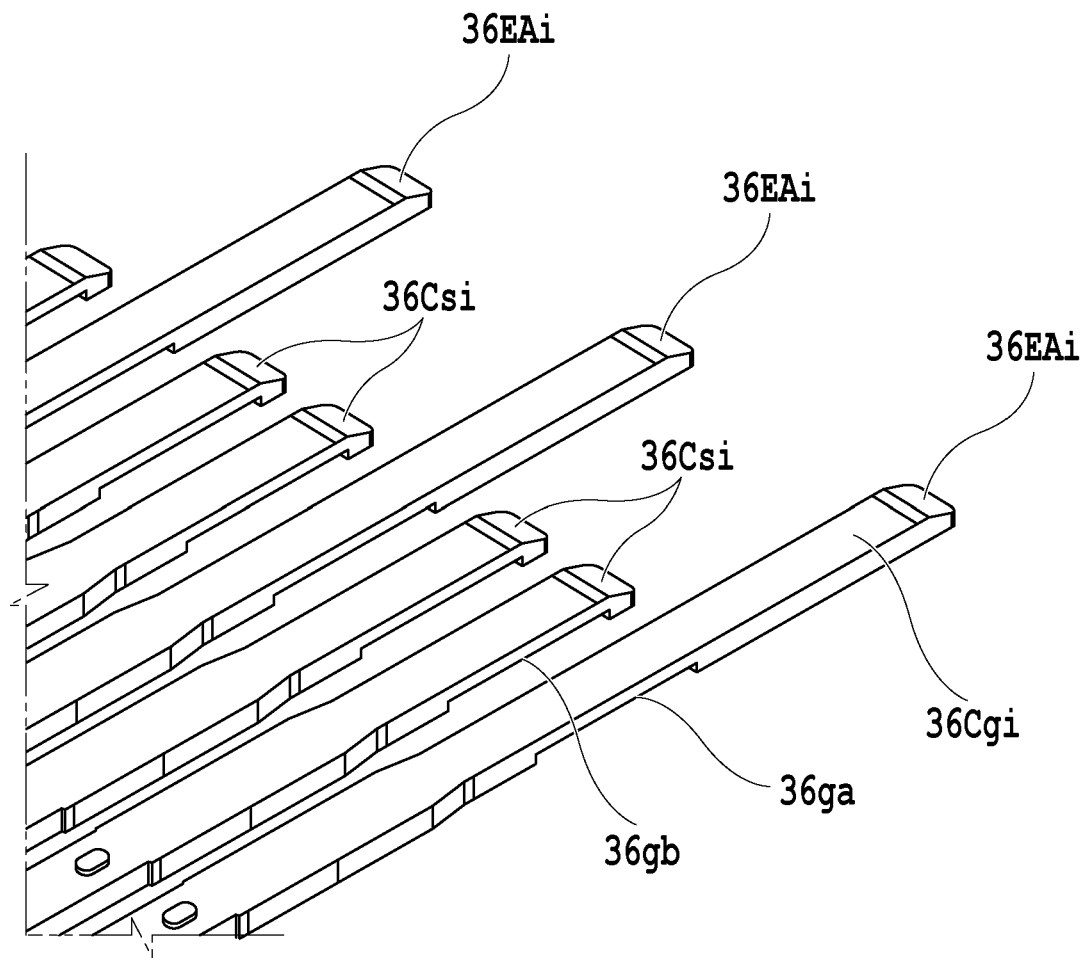
FIG. 21A is a perspective view showing part of the contact terminals used in the example shown in FIG. 20A.

The respective contact terminals 26ai and 28ai are configured to electrically connect the plug connector 16 of the optical module 14 to a group of electrodes (not shown) to be connected to a conductive pattern on the printed wiring board PB. As shown in FIGS. 15, 18, and 21A, each contact terminal 26ai includes: a movable contact portion 26M with one end provided with a contact point part 26P to come into contact with the corresponding contact terminal 16EAi of the plug connector 16 of the optical module 14; a fixation portion with one end provided with a fixation terminal part to be solder-fixed to the group of electrodes of the printed wiring board PB; and a joining portion 26F to join another end of the movable contact portion 26M to another end of the fixation portion. Each contact terminal 28ai includes: a movable contact portion with one end provided with a contact point part to come into contact with the corresponding contact terminal 16EBi of the plug connector 16 of the optical module 14; a fixation portion with one end provided with a fixation terminal part to be solder-fixed to the group of electrodes of the printed wiring board PB; and a joining portion to join another end of the movable contact portion to another end of the fixation portion.

As shown in FIG. 9, the connector insulator includes the slot 22A, which is molded by using a resin material and allows attachment and detachment of the plug connector 16 of the optical module 14.

The slot 22A is provided with a plurality of slits 22Si (i=1 to n, n is a positive integer), which are formed at given intervals along the Y coordinate axis shown in FIG. 9. Spaces between the adjacent slits 22Si are partitioned by partition walls 22Wi (i=1 to n, n is a positive integer). As shown in FIG. 18, the movable contact portion of the contact terminal 26ai and the movable contact portion of the contact terminal 28ai are located opposite to each other inside each slit 22Si. As shown in FIG. 9, chamfers 22CH1 and 22CH2 are provided, respectively, in the vicinity of two side surfaces of the connector insulator on the periphery of the slot 22A. Note that no chamfers for leading the plug connector 16 are provided in the vicinity of an upper portion of the connector insulator on the periphery of the slot 22A. A plurality of positioning pins to be fitted into positioning holes in the printed wiring board PB are formed at a bottom part of the connector insulator.

In the above-described configuration, when the plug connector 16 of the optical module 14 in its proper attitude is inserted into the module slot 12S of the receptacle cage 12 and is connected to the contact terminals 26ai and 28ai inside the slot 22A of the host connector 22 as shown in FIGS. 8 and 9, the stopper pieces 12RST and 12LST of the receptacle cage 12 are inserted into the grooves 14AG of the optical module 14, respectively, and then closed ends of the grooves 14AG reach and come into contact with the stopper pieces 12RST and 12LST as shown in FIG. 18. Thus, the inserted optical module 14 is held at a predetermined position. In this case, as shown in FIG. 18, the first inclined surface portion 14BF1 of the lower case 14B of the optical module 14 serving as the terminal run off is located away by a predetermined distance from the signal contact terminals 28ai. Thus, degradation in characteristics of a signal to be transmitted at a relatively high frequency band is prevented.

Figure 10:
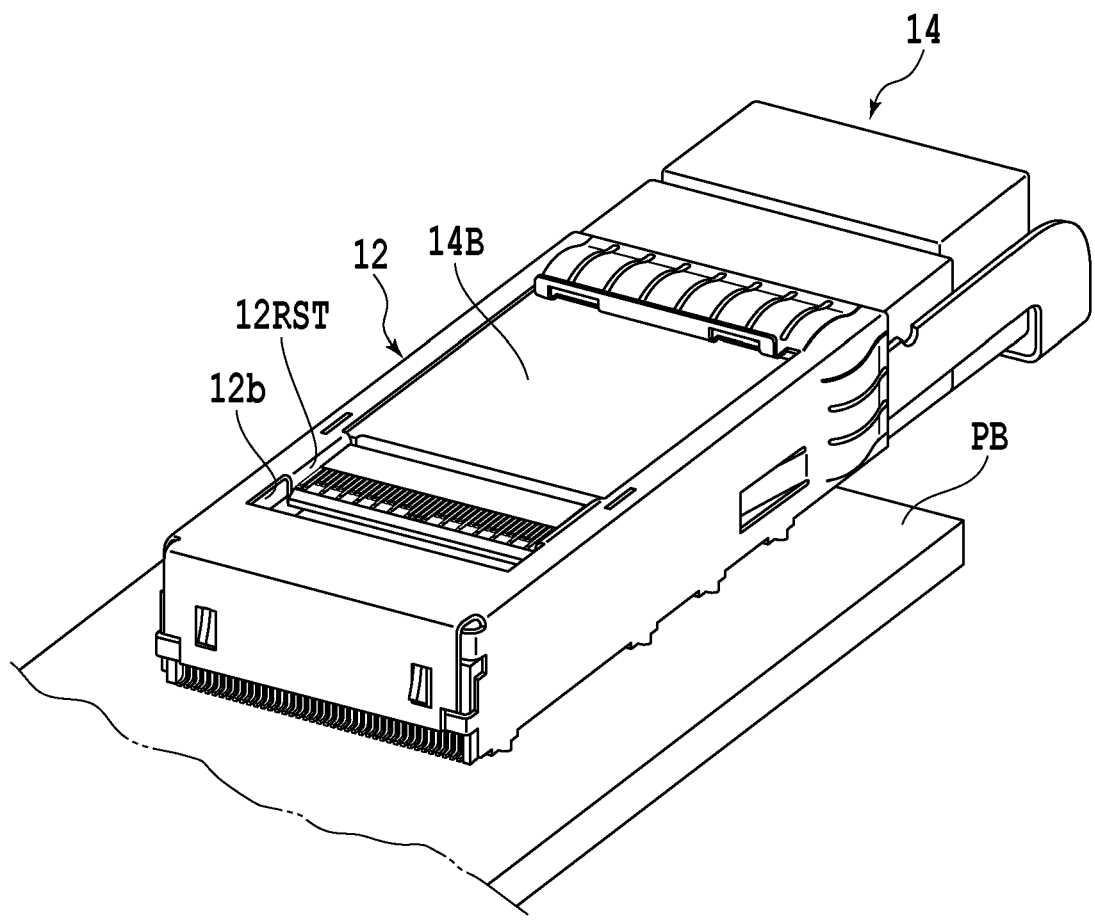
FIG. 10 is a perspective view made available for describing a wrong insertion operation of the optical module.

On the other hand, when the plug connector 16 of the optical module 14 in a wrong attitude, such as a vertically inverted attitude, is inserted into the module slot 12S (see FIG. 7A) of the receptacle cage 12 as shown in FIG. 10, the projection portions 14T on the lower case 14B of the optical module 14 butt the stopper pieces 12RST and 12LST of the receptacle cage 12, respectively. Accordingly, the wrong insertion of the optical module 14 is prevented in the middle of the insertion operation, and breakage of the plug connector 16 is also prevented as a consequence.

Note that a wrong insertion prevention mechanism of the optical module 14 is formed by including the stopper pieces 12RST and 12LST of the receptacle cage 12 and the respective projection portions 14T. However, the present invention is not limited only to this example but may apply other configurations.

Figure 12:
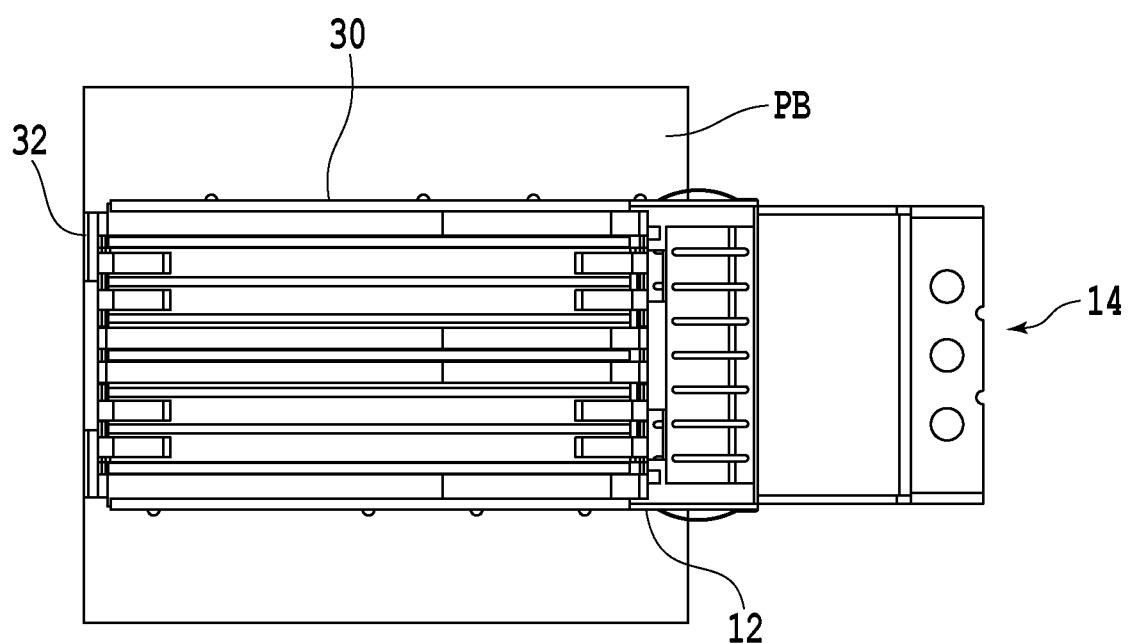
FIG. 12 is a plan view of the example shown in FIG. 11.
Figure 13:
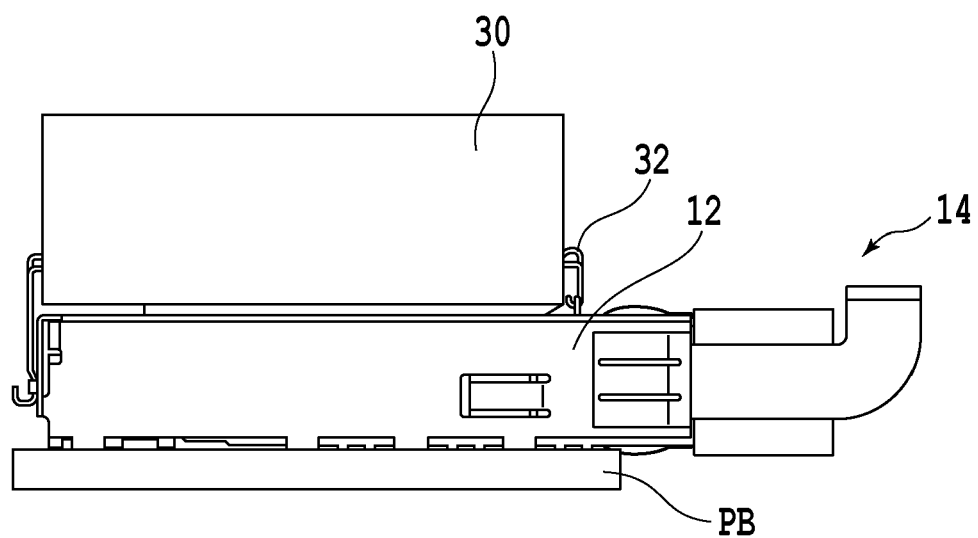
FIG. 13 is a front view of the example shown in FIG. 11.
Figure 14:
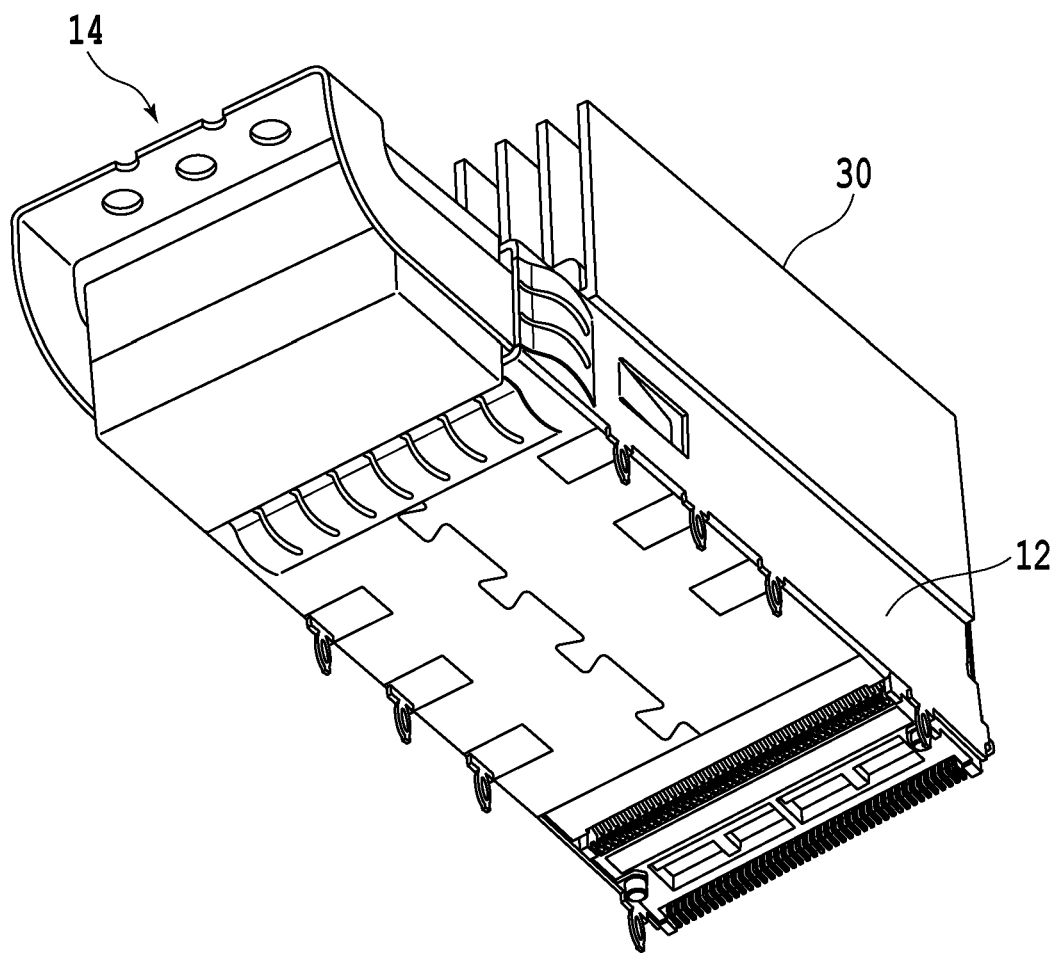
FIG. 14 is a perspective view of the example shown in FIG. 11 when seen from below.

As shown in FIGS. 11 to 13, the heatsink 30 to be held by the heatsink holder 32 is attachably and detachably fitted onto an upper surface of the receptacle cage 12.

The pair of fixing pieces to be attachably and detachably locked with the pair of hook portions 12ta provided on the upper surface of the receptacle cage 12, and the pair of fixing pieces to be attachably and detachably locked with the pair of hook members 12RF provided at the host connector side closed end portion of the receptacle cage 12 are provided on two ends of the heatsink holder 32. Both pairs of the fixing pieces are connected to one another by using a plurality of connecting pieces. In this way, when the heatsink 30 is attached to the upper surface of the receptacle cage 12, the heatsink 30 is first placed on the upper surface of the receptacle cage 12. Next, one of the pairs of fixing pieces of the heatsink holder 32 are locked with the holes in the pair of hook portions 12ta and then peripheral edges of the holes in the other pair of fixing pieces are fixed with the pair of hook members 12RF. On the other hand, when the heatsink 30 is detached from the receptacle cage 12, the heatsink 30 is easily detached by forcibly disengaging the other pair of fixing pieces of the heatsink holder 32 from the pair of hook members 12RF.

The heatsink 30 is made of a metal having good thermal conductivity such as aluminum. Fins 30fi (i=1 to n, n is a positive integer) that are arranged parallel to one another along the direction of attachment and detachment of the optical module 14 are provided to a base portion of the heatsink 30. A lower end portion of the base portion of the heatsink 30 is formed substantially into a T-shape so as to be inserted into the opening 12b and between the stopper pieces 12RST and 12LST of the receptacle cage 12. Thus, when the heatsink 30 is attached to the receptacle cage 12, the attachment of the heatsink 30 in a wrong attitude is prevented since the lower end portion of the heatsink 30 is formed substantially into the T-shape and a substantially receiving space in the opening 12b of the receptacle cage 12 is also formed substantially into the T-shape.

When the optical module 14 is attached to the receptacle cage 12 in the above-described configuration, a heat transfer surface (not shown) formed at a lower end of the heatsink 30 directly comes into contact with an outer peripheral surface of the upper case 14A of the optical module 14 through the opening 12b. Thus, heat generated in the optical module 14 is efficiently dissipated through the heatsink 30.

Figure 7B:
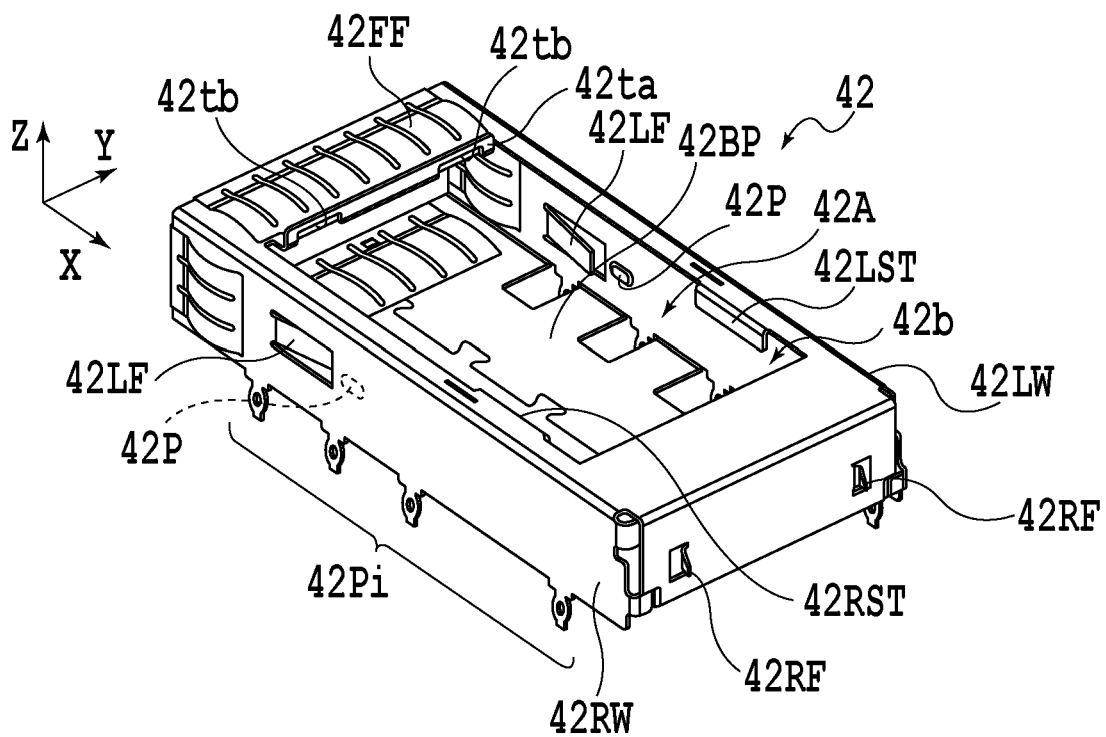
FIG. 7B is a perspective view showing another example of the receptacle cage used in an example of the receptacle assembly for transceiver module according to the present invention.

FIG. 7B shows another example of the receptacle cage used in the above-described receptacle assembly for optical module.

A receptacle cage 42 is made of a thin sheet of stainless steel or phosphor bronze by press work, for example, or preferably by use of stainless steel having good thermal conductivity. The receptacle cage 42 has a module accommodating portion 42A and a host connector accommodating portion which are provided inside.

The module accommodating portion 42A is formed by being surrounded by side walls 42RW and 42LW that are opposed to each other with a given interval therebetween, and a bottom wall portion 42BP thereof. The side walls 42RW and 42LW extend along the X coordinate axis in the orthogonal coordinates in FIG. 7B, that is, along the direction of attachment and detachment of the optical module 14. Each of the side walls 42RW and 42LW has a lock piece 42LF in the vicinity of a module slot 12S to be described later. Each lock piece 42LF is selectively engaged with the fixing piece of the release lever 14RL of the optical module 14 described above in such a way as to establish the locked state of the above-described optical module 14 with the module accommodating portion 42A. A projection portion 42P having a substantially oval shape is formed at a position adjacent to each lock piece 42LF, or a position that is adjacent in a direction to recede from the module slot 12S and corresponds to the lock piece 42LF, for example. The projection portions 42P are configured to protrude just by a given height in a range from about 0.1 mm to 0.2 mm, for instance, from inner peripheral surfaces of the side walls 42RW and 42LW toward the center of the module accommodating portion 42A. The position of each projection portion 42P is set such that the projection portion 42P comes into contact with one position in the vicinity of the fixing piece of the release lever 14RL of the optical module 14 to be inserted. Hereby, even when there is a play of the optical module 14 inside the receptacle cage 42 due to a gap attributed to a manufacturing error between an inner peripheral part of the receptacle cage 42 and the outer peripheral part of the optical module 14, the formation of the projection portions 42P reduces the play and allows the pair of fixing pieces of the release lever 14RL to be reliably locked with the lock pieces 42LF. Note that the shape of the projection portions 42P is not limited only to the substantially oval shape, and each projection portion 42P may be formed into a different shape such as a circular shape, for example.

The module slot 12S that is open in the direction of the X coordinate axis is provided to one end of the module accommodating portion 42A, whereby the optical module 14 is attached and detached through the module slot 12S. A front EMI finger portion 42FF in a tubular shape serving as a shield member is provided on the entire periphery of the module slot 12S having a substantially rectangular cross section. An inner peripheral part of the front EMI finger portion 42FF comes into contact with the outer peripheral part of the optical module 14 to be inserted, while an outer peripheral part of the front EMI finger portion 42FF comes into contact with the periphery of each opening provided in the operation side end face of the housing of the communication system, for example. In this way, when the receptacle cage 42 is press-fitted into the opening of the housing, a gap between the opening of the housing and the outer peripheral part of the receptacle cage 42 is shielded by the front EMI finger portion 42FF made of a metal. As a consequence, noise is confined to the inside of the housing, and the noise is unlikely to leak out through a gap between the outer peripheral part of the optical module 14 and an inner peripheral part of the module accommodating portion 42A.

Stopper pieces 42RST and 42LST each having a substantially L-shaped cross section are integrally formed at given positions on inner peripheral surfaces of the side walls 42RW and 42LW of the module accommodating portion 42A, respectively.

Moreover, another end of the module accommodating portion 42A, which is opposed to the module slot 12S, communicates with the inside of the host connector accommodating portion. A substantially rectangular opening 42b that is open along the Z coordinate axis is formed at a portion opposed to the bottom wall portion 42BP. The stopper pieces 42RST and 42LST protrude inward and downward from the periphery of the opening 42b. In this way, a distance between the stopper pieces 42RST and 42LST opposed to each other becomes smaller than the corresponding distance of the opening 42b.

On the periphery of the opening 42b, a pair of hook portions 42ta to selectively hold the pair of fixing pieces (see FIG. 13) of the heatsink holder 32 are integrally formed on the receptacle cage 42. The pair of hook portions 42ta include lock holes 42tb in a line along the direction of the Y coordinate axis with a given interval corresponding to the interval of the pair of fixing pieces mentioned above.

End portions on both of short sides of the bottom wall portion 42BP, which connects lower ends of the side walls 42RW and 42LW to each other, are in contact with the surface of the printed wiring board PB. Press-fitting nibs 42Pi (i=1 to n, n is a positive integer) are formed at given intervals on both of long sides of the bottom wall portion 42BP, respectively. Each press-fitting nib 42Pi is press-fitted into the corresponding one of the pores (not shown) formed in the surface of the printed wiring board PB in conformity with the arrays of the press-fitting nibs 42Pi. Thus, a lower end surface of the receptacle cage 42 is closely fixed to the surface of the printed wiring board PB.

The host connector accommodating portion which is open toward the surface of the printed wiring board PB is formed by being surrounded by a host connector side closed end portion opposed to the module slot 12S of the receptacle cage 42, an upper surface constituting the periphery of the opening 42b on the host connector side, and host connector side portions of the side walls 42RW and 42LW.

On an outer peripheral part of the host connector side closed end portion, a pair of hook members 42RF to fix the pair of fixing portions of the heatsink holder 32 described above are formed integrally with the receptacle cage 42. An opening is formed on the periphery of each hook member 42RF.

Figure 7C:
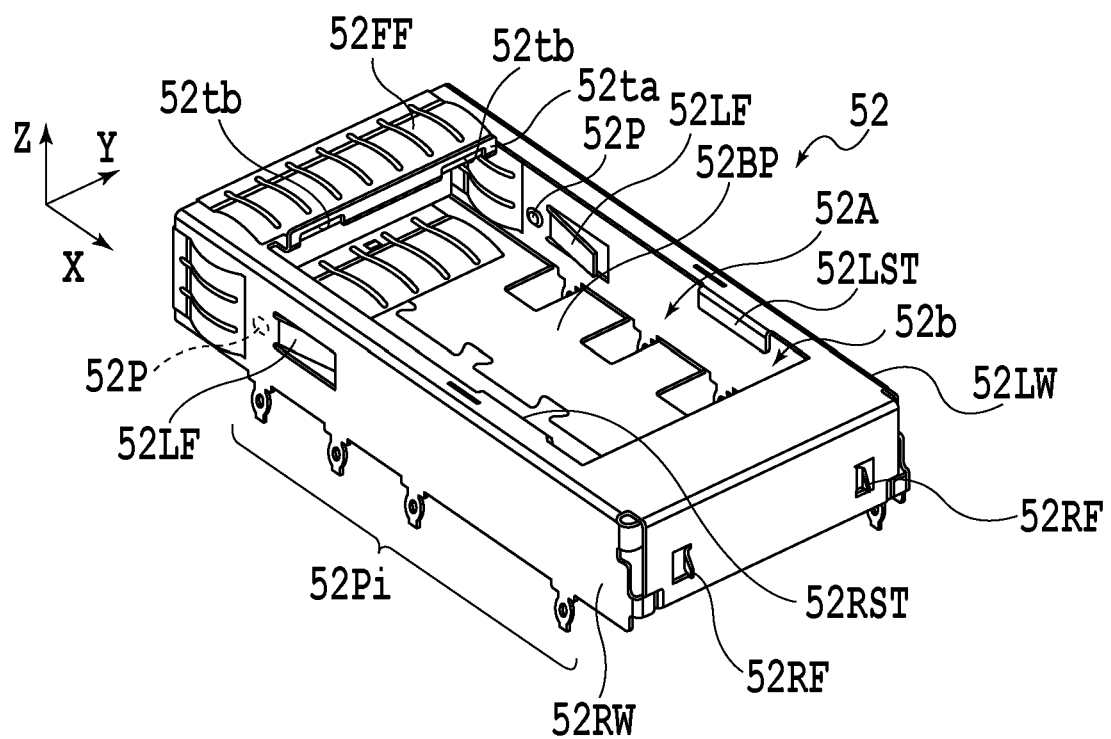
FIG. 7C is a perspective view showing still another example of the receptacle cage used in an example of the receptacle assembly for transceiver module according to the present invention.

FIG. 7C shows still another example of the receptacle cage used in the above-described receptacle assembly for optical module.

A receptacle cage 52 is made of a thin sheet of stainless steel or phosphor bronze by press work, for example, or preferably by use of stainless steel having good thermal conductivity. The receptacle cage 52 has a module accommodating portion 52A and a host connector accommodating portion which are provided inside.

The module accommodating portion 52A is formed by being surrounded by side walls 52RW and 52LW that are opposed to each other with a given interval therebetween, and a bottom wall portion 52BP thereof. The side walls 52RW and 52LW extend along the X coordinate axis in the orthogonal coordinates in FIG. 7C, that is, along the direction of attachment and detachment of the optical module 14. Each of the side walls 52RW and 52LW has a lock piece 52LF in the vicinity of a module slot 12S to be described later. Each lock piece 52LF is selectively engaged with the fixing piece of the release lever 14RL of the optical module 14 described above in such a way as to establish the locked state of the above-described optical module 14 with the module accommodating portion 52A. A projection portion 52P having a substantially circular shape is formed at a position adjacent to each lock piece 52LF, or a position that is adjacent in a direction to approach the module slot 12S and corresponds to the lock piece 52LF, for example. The projection portions 52P are configured to protrude just by a given height in a range from about 0.1 mm to 0.2 mm, for instance, from inner peripheral surfaces of the side walls 52RW and 52LW toward the center of the module accommodating portion 52A. The position of each projection portion 52P is set such that the projection portion 52P comes into contact with one position in the vicinity of the fixing piece of the release lever 14RL of the optical module 14 to be inserted. Hereby, even when there is a play of the optical module 14 inside the receptacle cage 52 due to a gap attributed to a manufacturing error between an inner peripheral part of the receptacle cage 52 and the outer peripheral part of the optical module 14, the formation of the projection portions 52P reduces the play and allows the pair of fixing pieces of the release lever 14RL to be reliably locked with the lock pieces 52LF. Note that the shape of the projection portions 52P is not limited only to the substantially circular shape, and each projection portion 52P may be formed into a different shape such as an oval shape.

The module slot 12S that is open in the direction of the X coordinate axis is provided to one end of the module accommodating portion 52A, whereby the optical module 14 is attached and detached through the module slot 12S. A front EMI finger portion 52FF in a tubular shape serving as a shield member is provided on the entire periphery of the module slot 12S having a substantially rectangular cross section. An inner peripheral part of the front EMI finger portion 52FF comes into contact with the outer peripheral part of the optical module 14 to be inserted, while an outer peripheral part of the front EMI finger portion 52FF comes into contact with the periphery of each opening provided in the operation side end face of the housing of the communication system, for example. In this way, when the receptacle cage 52 is press-fitted into the opening of the housing, a gap between the opening of the housing and the outer peripheral part of the receptacle cage 52 is shielded by the front EMI finger portion 52FF made of a metal. As a consequence, noise is confined to the inside of the housing, and the noise is unlikely to leak out through a gap between the outer peripheral part of the optical module 14 and an inner peripheral part of the module accommodating portion 52A.

Stopper pieces 52RST and 52LST each having a substantially L-shaped cross section are integrally formed at given positions on inner peripheral surfaces of the side walls 52RW and 52LW of the module accommodating portion 52A, respectively.

Moreover, another end of the module accommodating portion 52A, which is opposed to the module slot 12S, communicates with the inside of the host connector accommodating portion. A substantially rectangular opening 52*b* that is open along the Z coordinate axis is formed at a portion opposed to the bottom wall portion 52BP. The stopper pieces 52RST and 52LST protrude inward and downward from the periphery of the opening 52*b*. In this way, a distance between the stopper pieces 52RST and 52LST opposed to each other becomes smaller than the corresponding distance of the opening 52*b*.

On the periphery of the opening 52*b*, a pair of hook portions 52*ta* to selectively hold the pair of fixing pieces (see FIG. 13) of the heatsink holder 32 are integrally formed on the receptacle cage 52. The pair of hook portions 52*ta* include lock holes 52*tb* in a line along the direction of the Y coordinate axis with a given interval corresponding to the interval of the pair of fixing pieces mentioned above.

End portions on both of short sides of the bottom wall portion 52BP, which connects lower ends of the side walls 52RW and 52LW to each other, are in contact with the surface of the printed wiring board PB. Press-fitting nibs 52Pi (i=1 to n, n is a positive integer) are formed at given intervals on both of long sides of the bottom wall portion 52BP, respectively. Each press-fitting nib 52Pi is press-fitted into the corresponding one of the pores (not shown) formed in the surface of the printed wiring board PB in conformity with the arrays of the press-fitting nibs 52Pi. Thus, a lower end surface of the receptacle cage 52 is closely fixed to the surface of the printed wiring board PB.

The host connector accommodating portion which is open toward the surface of the printed wiring board PB is formed by being surrounded by a host connector side closed end portion opposed to the module slot 12S of the receptacle cage 52, an upper surface constituting the periphery of the opening 52*b* on the host connector side, and host connector side portions of the side walls 52RW and 52LW.

On an outer peripheral part of the host connector side closed end portion, a pair of hook members 52RF to lock the pair of fixing portions of the heatsink holder 32 described above are formed integrally with the receptacle cage 52. An opening is formed on the periphery of each hook member 52RF.

It should be noted that in the above-described examples shown in FIGS. 7B and 7C, respectively, the projection portions 42P and 52P are formed face to face. However, the present invention is not limited only to these examples. For instance, of the pair of projection portions, one projection portion may be located near the lock piece in the direction to approach the module slot 12S while the other projection portion may be located near the lock piece in the direction to recede from the module slot 12S.

Figure 19A:
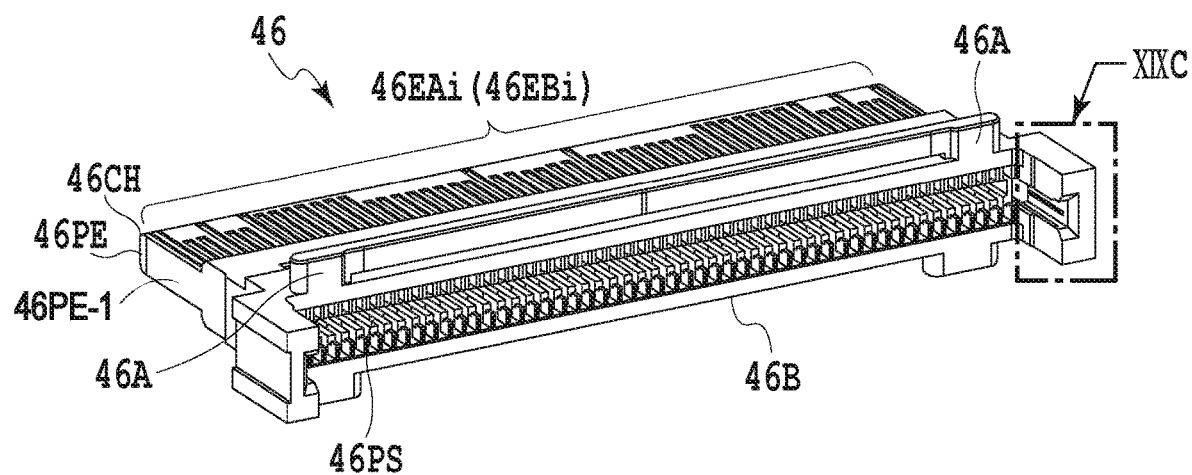
FIG. 19A is a perspective view showing an external appearance of another example of the plug connector for transceiver module according to the present invention.
Figure 19B:
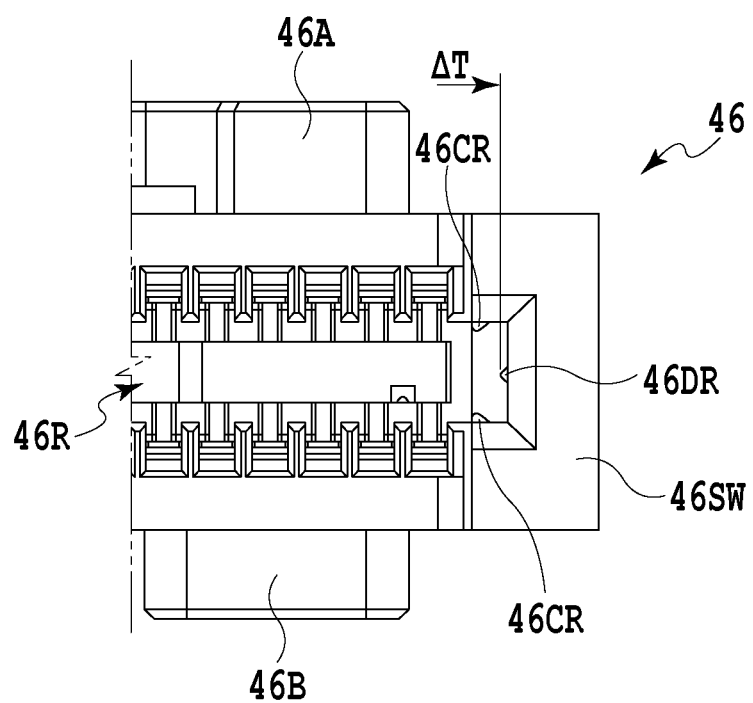
FIG. 19B is a partial enlarged view showing an enlarged portion in the example shown in FIG. 19A.
Figure 19C:
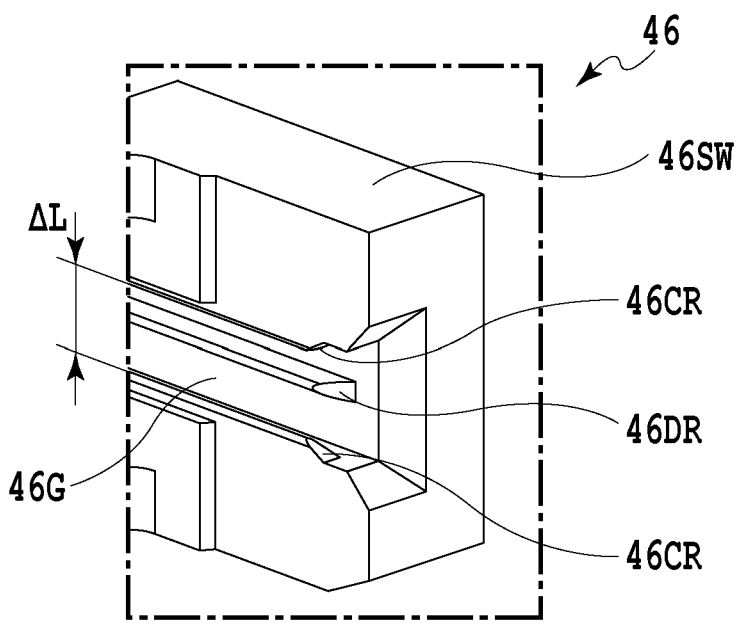
FIG. 19C is a partial enlarged view showing an enlarged portion C in the example shown in FIG. 19A.

FIGS. 19A, 19B, and 19C show other examples of the plug connector for transceiver module according to the present invention, respectively.

In the above-described example shown in FIG. 6, each crush rib 16CR is formed in such a way as to bulge from any of the wall surface portion forming the upper surface in the vicinity of the side portion of the concave portion 16R and the wall surface portion forming the lower surface in the vicinity of the side portion of the concave portion 16R. On the other hand, in the example shown in FIG. 19A, on the wall surface portion forming the upper surface in the vicinity of the side portion of the concave portion and on the wall surface portion forming the lower surface of the concave portion, crush ribs 46DR are additionally formed inside the respective side surfaces forming the respective side portions of the concave portion.

In FIG. 19A, a plug connector 46 is integrally molded by using a resin material, for example, and comprises a connection end 46PE, a board support portion 46PE−1 being continuous with the connection end 46PE and supporting the one end portion of the module board 18 described above, and a plurality of contact terminals 46EAi and 46EBi (i=1 to n, n is a positive integer) supported by the connection end 46PE and the board support portion 46PE-1.

The connection end 46PE protrudes from the open end portions of the upper case 14A and the lower case 14B of the optical module 14 described above, and is inserted into the slot of the host connector 22. As shown in the enlarged view of FIG. 19B, the connection end 46PE has a concave portion 46R which is provided in the inside and configured to allow insertion of the one end of the module board 18 described above. The concave portion 46R communicates with an open end portion 46PS of the board support portion 46PE-1. Moreover, on both side portions of the concave portion 46R, a pair of side wall portions 46SW are formed integrally with the board support portion 46PE-1 and in such a way as to be opposed to each other. At a closed end portion constituting part of the concave portion 46R, a projection portion (not shown) is formed at a substantially central part that corresponds to the notch portion 18PH of the module board 18. The projection portion and the notch portion 18PH functioning as the positioning portions are set in advance such that the respective contact terminals 46EAi and 46EBi correspond to the prescribed contact pads 18Ei. Moreover, as shown in the enlarged view of FIG. 19C, pairs of crush ribs 46CR are formed at two locations away from the projection portion toward a side portion in the concave portion 46R in order to pinch and position the ends of the module board 18 so as maintain the posture of the module board 18 to be parallel to the upper face of the connection end 46PE. One of the pairs of crush ribs 46CR are illustrated in FIG. 19C while the other pair of the crush ribs 46CR are not illustrated therein.

Each pair of crush ribs 46CR are formed in such a way as to bulge from a wall surface portion forming an upper surface of a guide groove 46G formed inside of the side wall portion 46SW and from a wall surface portion forming a lower surface of the guide groove, respectively. The pair of crush ribs 46CR opposed to each other extend straight and continuously along the side portions for a predetermined length from an open end portion of the guide groove 46G to a closed end portion of the guide groove 46G, for example. It should be noted that the respective crush ribs 46CR may be formed dividedly. In FIG. 19C, when the thickness of the module board 18 is 1.0 mm±0.1 mm, for instance, a distance ΔL between tips of the crush ribs 46CR is set to 0.73 mm±0.1 mm, for example, so as to crush a portion of the module board 18.

Note that although the pairs of the crush ribs 46CR are formed away from each other at the two positions, the crush ribs are not limited to this example. For instance, another pair of crush ribs 46CR may be additionally formed at least at one or more position between the pairs of crush ribs 46CR at the two positions.

Moreover, a crush rib 46DR is formed in such a way as to bulge from an intermediate portion of a wall surface portion, which is placed between the corresponding pair of crush ribs 46CR to form a side surface of the guide groove 46G. Another crush rib 46DR is formed likewise in the other guide groove 46G. For example, a distance ΔT between tips of the pair of crush ribs 46DR is set to (C−D−0.15) mm±0.1 mm assuming that C is a lateral width of the module board 18 and D is a tolerance thereof, respectively. More specifically, when the lateral width of the module board 18 is 18.0 mm±0.1 mm, for instance, the distance ΔT is set to 17.75 mm±0.1 mm, for example, so as to crush a portion of the module board 18. Moreover, when the lateral width of the module board 18 is 32.65 mm±0.1 mm, for instance, the distance ΔT is set to 32.40 mm±0.1 mm. Herewith, positioning of the module board 18 inserted into the guide grooves 46G along the direction of arrangement of the contact pads is established so as to maintain the posture of the module board 18 to be parallel to the upper face of the connection end 46PE.

The connection end 46PE has, at the tip end of the outer periphery thereof, a pair of chamfers 46CH that are formed along the arrangement direction of the contact terminals 16EAi and 16EBi from one side face to the other side face, the pair of chamfers 46CH functioning as a guide for the plug connector 46 into the slot of the above-described host connector 22. The chamfer 46CH is set to about C 0.5, for example. A predetermined chamfer smaller than the chamfer 46CH is provided at both side faces at the outer periphery of the connection end 46PE. This allows the tip end of the connection end 46PE to have a substantially acute arch-like cross sectional shape. Thus, because there is no need to form a chamfered portion for leading the plug connector 46 at the periphery of the slot of the host connector 22, this allow the dimension of the plug connector 16 in the host connector 22 along the attachment/detachment direction to be reduced correspondingly.

The board support portion 46PE-1 of the plug connector 46 includes the open end portion 46PS that allows the passage of the one end of the module board 18 to be inserted. A pair of positioning portions 46A to come into contact with the board support walls (not shown) inside the upper case 14A and the lower case 14B are formed away from each other on an upper surface of the board support portion 46PE-1. Moreover, an elongated spring portion 46B that comes into contact with the board support walls (not shown) inside the upper case 14A and the lower case 14B is formed on a lower surface of the board support portion 46PE-1. Spring stiffness of the elongated spring portion 46B is set in a range from 10.0 to 25.0 (N/mm), for example.

The contact terminals 46EAi are arranged on the upper surface of the connection terminal portion 46PE, which is opposed to the pair of positioning portions 46A of the board support portion 46PE-1, and at given intervals corresponding to the above-described contact pads 18Ei. The contact terminals 46EAi include power source terminals, signal contact terminals, and grounding contact terminals, for example. For instance, a pair of the signal contact terminals adjacent to each other are located between the grounding contact terminals. Each contact terminal 46EAi includes a fixed terminal portion to be solder-fixed to the corresponding contact pad 18Ei, and a contact portion to come into contact with a contact portion of a corresponding contact terminal of the host connector 22.

The contact terminals 46EBi are arranged on the lower surface of the connection terminal portion 46PE, which is opposed to the spring portion 46B of the board support portion 46PE-1, and at the given intervals corresponding to the above-described contact pads 18Ei. The contact terminals 46EBi include power source terminals, signal contact terminals, and grounding contact terminals, for example. For instance, a pair of the signal contact terminals adjacent to each other are located between the grounding contact terminals. Each contact terminal 46EBi includes a fixed terminal portion to be solder-fixed to the corresponding contact pad 18Ei, and a contact portion to come into contact with a contact portion of the corresponding contact terminal of the host connector 22.

In the above-described configuration, when the one end portion of the module board 18 is guided by the guide grooves 46G and inserted and connected to the concave portion 46R of the plug connector 46, the projection portion formed on the periphery of the concave portion 16R of the plug connector 46 is fitted into the notch portion 18PH as the one end surface of the module board 18 comes into contact with an inner peripheral surface that forms the concave portion 46R. Thus, the contact terminals 46EAi and 46EBi are positioned relative to the respective contact pads 18Ei on the module board 18.

Figure 20A:
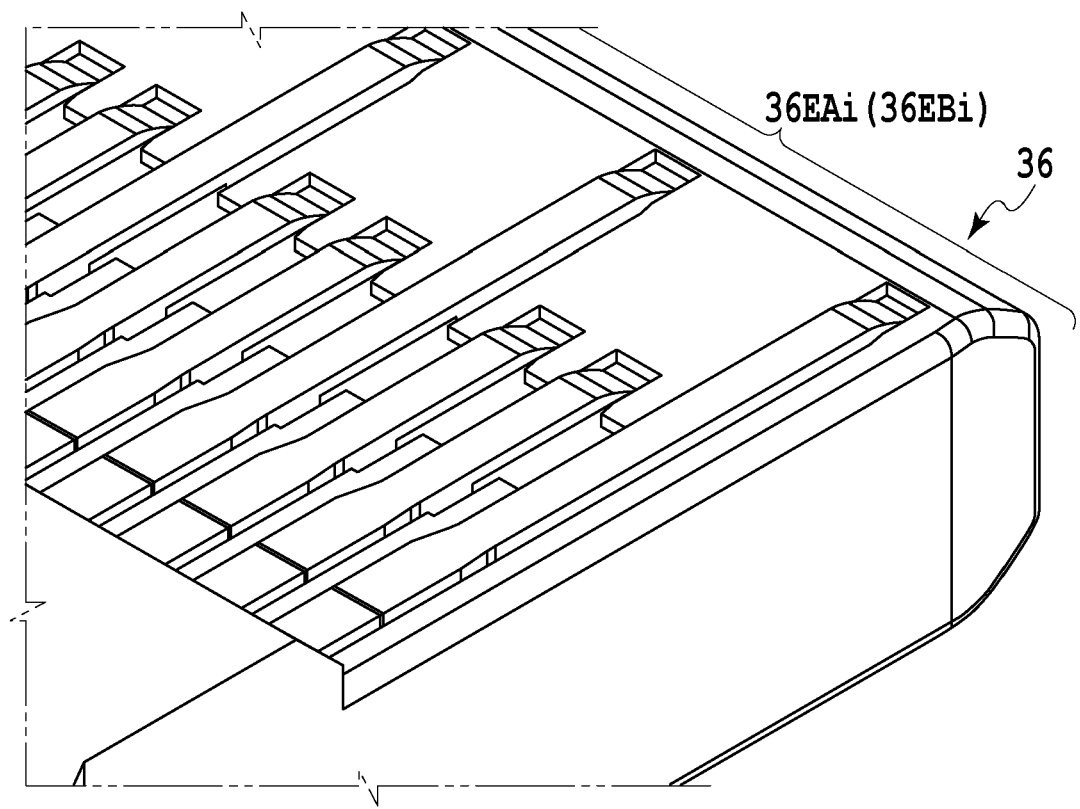
FIG. 20A is a perspective view showing a partial enlarged main part of still another example of the plug connector for transceiver module according to the present invention.
Figure 20B:
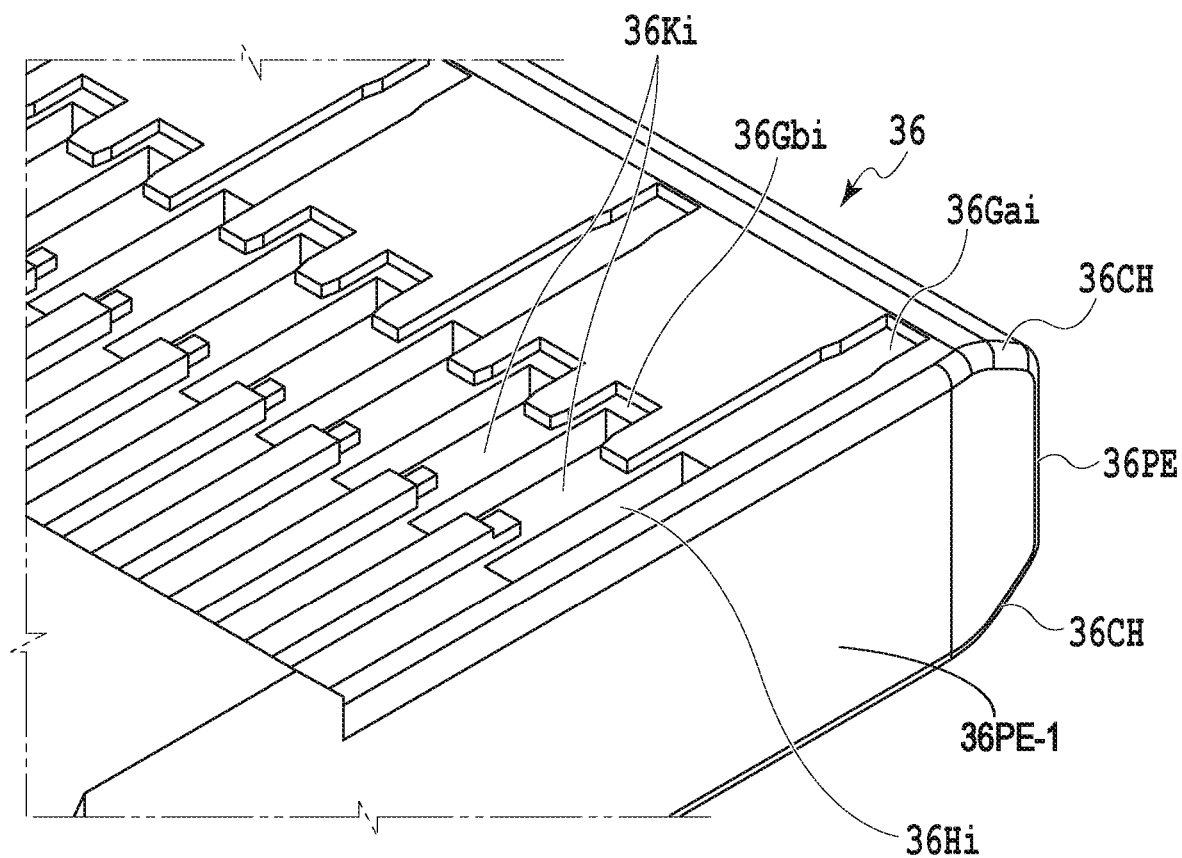
FIG. 20B is a perspective view showing a state in which contact terminals are detached from the example in FIG. 20A.

FIGS. 20A and 20B show a partial enlarged main part of still another example of the plug connector and the plurality of contact terminals to be connected to the above-described module board 18, respectively.

A plug connector 36 is integrally molded by using a resin material, for example, and comprises a connection end 36PE, a board support portion 36PE-1 being continuous with the connection end 36PE and supporting the one end portion of the module board 18, and a plurality of contact terminals 36EAi and 36EBi (i=1 to n, n is a positive integer) supported by the connection end 36PE and the board support portion 36PE-1.

The connection end 36PE protrudes from the open end portions of the upper case 14A and the lower case 14B, and is inserted into the slot of the host connector 22. The connection end 36PE has a concave portion (not shown) which is provided in the inside and configured to allow insertion of the one end of the module board 18. Both side portions of the concave portion are open to the outside. At a closed end portion forming part of the concave portion, a projection portion (not shown) is formed at a substantially central position that corresponds to the notch portion 18PH of the module board 18. The projection portion and the notch portion 18PH functioning as the positioning portions are set in advance such that the respective contact terminals 36EAi and 36EBi correspond to the prescribed contact pads 18Ei.

Both side surfaces of the connection end 36PE are located on planes that are common to the both side surfaces of the module board 18, respectively. The connection end 36PE has, at the tip end of the outer periphery thereof, a pair of chamfers 36CH that are formed along the arrangement direction of the contact terminals 36EAi and 36EBi from one side face to the other side face, the pair of chamfers 36CH functioning as a guide for the plug connector 36 into the slot of the above-described host connector 22. This allows the tip end of the connection end 36PE to have a substantially acute arch-like cross sectional shape. Thus, because there is no need to form a chamfered portion for leading the plug connector 36 at the periphery of the slot of the host connector 22, this allow the dimension of the plug connector 36 in the host connector 22 along the attachment/detachment direction to be reduced correspondingly.

The board support portion 36PE-1 of the plug connector 36 includes an open end portion (not shown) that allows the passage of the one end of the module board 18 to be inserted. A pair of positioning portions to come into contact with the board support walls (not shown) inside the upper case 14A and the lower case 14B are formed away from each other on an upper surface of the board support portion 36PE-1. Moreover, an elongated spring portion (not shown) that comes into contact with the board support walls (not shown) inside the upper case 14A and the lower case 14B is formed on a lower surface of the board support portion 36PE-1.

As shown in the partial enlarged view of FIG. 22B, an upper surface of the connection end 36PE is provided with relatively shallow grooves 36Gai and 36Gbi (i=1 to n, n is a positive integer), into which contact portions of grounding contact terminals 36Cgi and signal contact terminals 36Csi (i=1 to n, n is a positive integer), constituting the contact terminals 36EAi to be described later, are to be inserted, respectively. An end portion of groove 36Gai extends closer to the corresponding chamfer 36CH than an end portion of groove 36Gbi does. Slits 36Hi (i=1 to n, n is a positive integer) penetrate the grooves 36Gai and the grooves 36Gbi in a thickness direction of the connection end 36PE. The slits 36Hi are formed in a line along a direction of arrangement of the grooves 36Gai and the grooves 36Gbi. The grooves 36Gai and the grooves 36Gbi adjacent thereto communicate with one another through notch portions 36Ki (i=1 to n, n is a positive integer). Each notch portion 36Ki is formed on a straight line that is common to the slits 36Hi. Moreover, a lower surface of the connection end 36PE is also provided with relatively shallow grooves likewise, into which contact portions of grounding contact terminals and signal contact terminals constituting the contact terminals 36EBi to be described later are to be inserted, respectively. It should be noted that the contact terminals 36EAi and the contact terminals 36EBi have the same structure and thus the contact terminals 36EAi will be described below while omitting the description of the contact terminals 36EBi.

The contact terminals 36EAi are placed on the upper surface of the connection end 36PE, which is opposed to the pair of positioning portions of the board support portion 36PE-1, and at given intervals corresponding to the above-described contact pads 18Ei. As shown in the partial enlarged view of FIG. 21A, the contact terminals 36EAi comprise the signal contact terminals 36Csi and the grounding contact terminals 36Cgi, for example. For instance, a pair of the signal contact terminals 36Csi adjacent to each other are placed between the grounding contact terminals 36Cgi.

Each of the signal contact terminals 36Csi and the grounding contact terminals 36Cgi has a fixed terminal portion (not shown) to be solder-fixed to the corresponding contact pad 18Ei, and a contact portion to come into contact with a contact portion of a corresponding contact terminal of the host connector 22.

Each signal contact terminal 36Csi is provided with a thinned portion 36$gb$, which is located at a position close to a tip portion of its contact portion and opposed to the corresponding slit 36Hi of the groove 36Gbi. Moreover, each grounding contact terminal 36Cgi is provided with a thinned portion 36$ga$, which is located at a position close to a tip portion of its contact portion and opposed to the corresponding slit 36Hi of the groove 36Gai. Each of the thinned portions 36$ga$ and the thinned portions 36$gb$ extends for a given length in a longitudinal direction of the contact terminal and spreads in a width direction thereof.

Figure 21B:
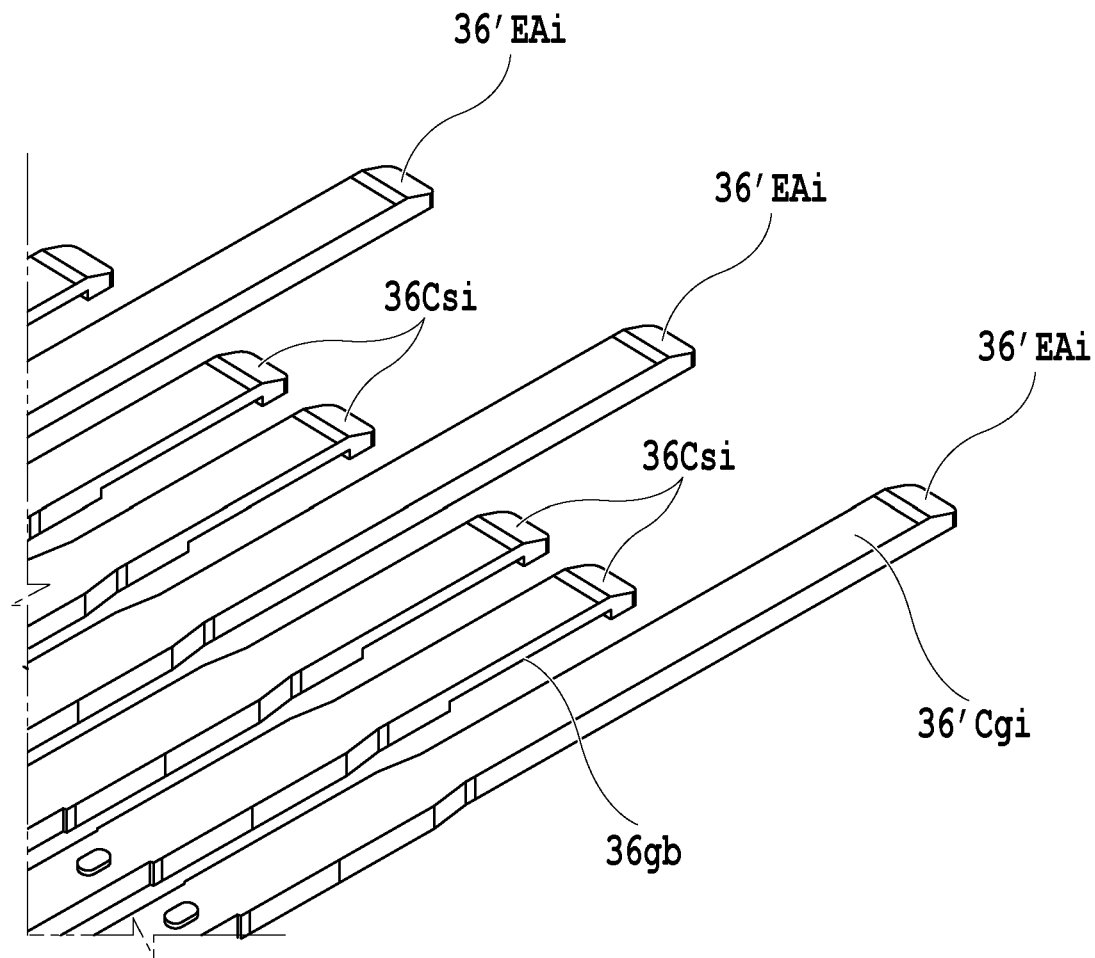
FIG. 21B is a perspective view showing part of another example of the contact terminals used in the example shown in FIG. 20A.

Note that the contact terminals 36EAi are not limited only to the above-described example. For instance, as shown in the partial enlarged view of FIG. 21B, a grounding contact terminal 36'Cgi constituting a portion of a contact terminal 36' EAi may not be provided with a thinned portion. In FIG. 21B, constituents that are the same as the constituents in FIG. 21A will be denoted by the same reference signs and overlapping explanations thereof will be omitted.

Figure 22A:
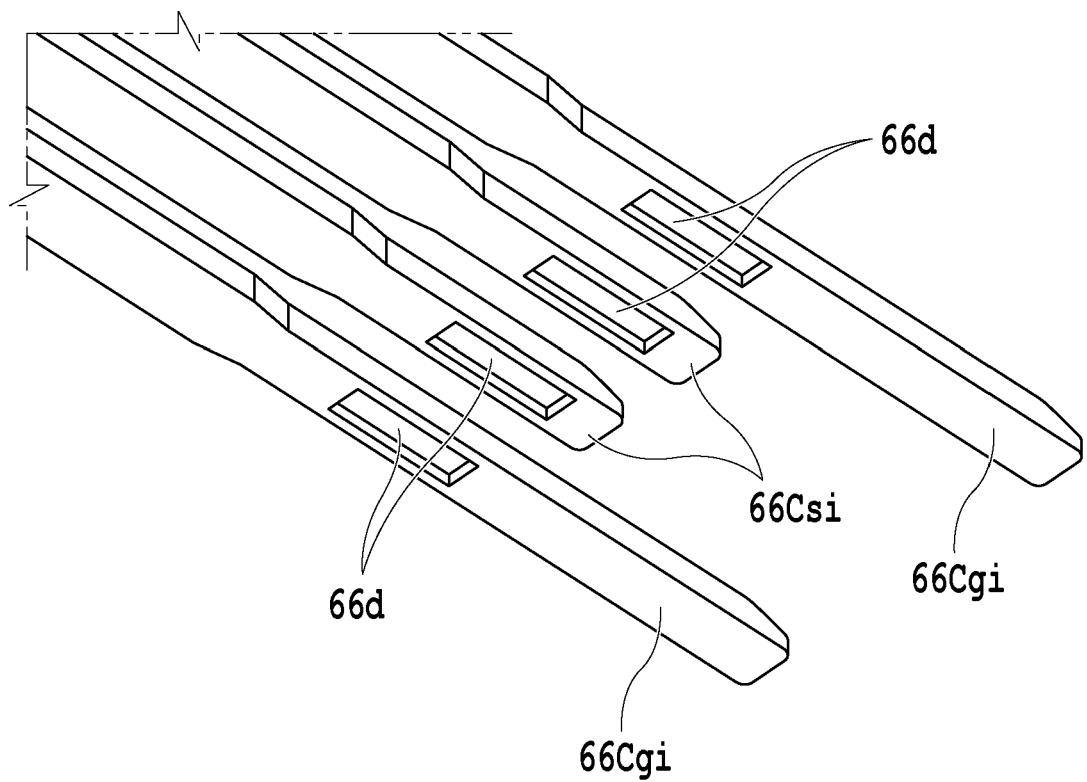
FIG. 22A is a perspective view showing part of still another example of the contact terminals used in the example shown in FIG. 20A.
Figure 22B:
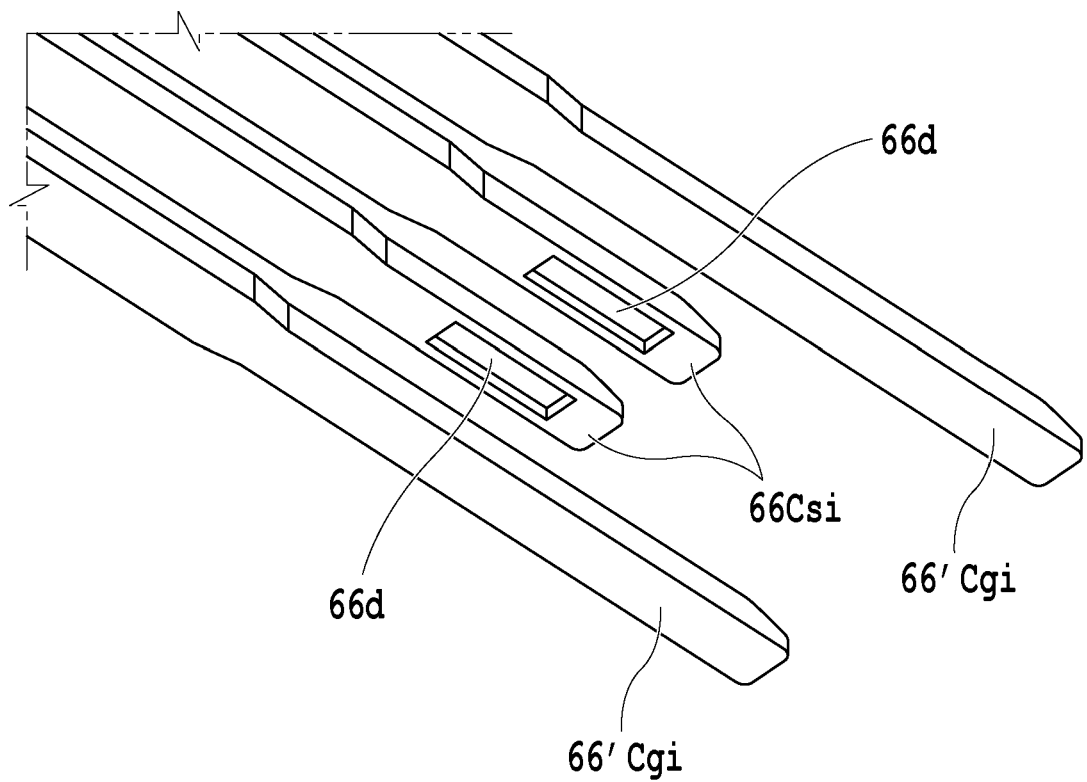
FIG. 22B is a perspective view showing part of yet another example of the contact terminals used in the example shown in FIG. 20A.

Furthermore, as shown in the partial enlarged view of FIG. 22A, tip portions of contact portions of grounding contact terminals 66Cgi (i=1 to n, n is a positive integer), which constitute the contact terminals 36EAi to be provided on an upper surface of the connection end 36PE, may be provided with relatively shallow dents 66$d$ at positions opposed to the slits 36Hi of the grooves 36Gbi described above. Moreover, tip portions of signal contact terminals 66Csi may be provided with relatively shallow dents 66$d$ at positions opposed to the slits 36Hi of the grooves 36Gai. Each dent 66$d$ having a substantially rectangular shape extends for a given length in the longitudinal direction of the contact terminal with a given width less than a width of the contact terminal.

It should be noted that the contact terminals 36EAi are not limited only to the above-described example. For instance, as shown in the partial enlarged view of FIG. 22B, a grounding contact terminal 66'Cgi constituting part of the contact terminal 36'EAi may not be provided with a relatively shallow dent. In FIG. 22B, constituents that are the same as the constituents in FIG. 22A will be denoted by the same reference signs and overlapping explanations thereof will be omitted.

The invention claimed is:

1. A module assembly comprising:
a module board; and
a plug connector for a transceiver module including
a connection end having therein a concave portion forming an opening to which one end of the module board is inserted;
a plurality of contact terminals that are provided on the outer periphery face of the connection end and that are connected to electrode portions of the module board; and
a positioning portion that is formed in the concave portion of the connection end and that has a pair of crush ribs engaged with the periphery of an open end of a notch portion of one end of the module board to thereby position the contact terminals to the electrode portions of the module board, wherein, both sides in the concave portion are outwardly opened such that both sides at the one end of the module board are not covered with the connection end, and
wherein the electrode portions of the module board are formed at a position further away from an end surface of the one end than a position of a closed end of the notch portion.

2. A transceiver module assembly comprising:
a transceiver module including
the module assembly according to claim 1, and
a housing configured to accommodate the transceiver module assembly; and
a receptacle assembly for the transceiver module including
a connector connected to the transceiver module, and
a receptacle cage including
a module accommodating portion including a module slot provided at one end and configured to allow passage of the transceiver module, the module accommodating portion being configured to attachably and detachably accommodate the transceiver module,
a connector accommodating portion communicating with the module accommodating portion and being configured to accommodate the connector, and
a stopper piece provided at the module accommodating portion and configured to guide the transceiver module in a first attitude being inserted into the module accommodating portion, and when the transceiver module in a second attitude inverted from the first attitude is inserted into the module accommodating portion, to restrict an insertion operation of the transceiver module.

3. A transceiver module assembly comprising:
a transceiver module including
a module assembly comprising:
a module board, and
a plug connector for the transceiver module including
a connection end having therein a concave portion forming an opening to which one end of the module board is inserted,
a plurality of contact terminals that are provided on the outer periphery face of the connection end and that are connected to electrode portions of the module board, and
a positioning portion that is formed in the concave portion of the connection end and that is engaged with a notch portion of one end of the module board to thereby position the contact terminals to the electrode portions of the module board, wherein, both sides in the concave portion are outwardly opened such that both sides at the one end of the module board are not covered with the connection end, and
wherein the electrode portions of the module board are formed at a position further away from an end surface of the one end than a position of a closed end of the notch portion, and
a housing configured to accommodate the transceiver module assembly; and
a receptacle assembly for the transceiver module including
a connector connected to the transceiver module, and
a receptacle cage including
a module accommodating portion including a module slot provided at one end and configured to allow passage of the transceiver module, the module accommodating portion being configured to attachably and detachably accommodate the transceiver module,
a connector accommodating portion communicating with the module accommodating portion and being configured to accommodate the connector, and
a stopper piece provided at the module accommodating portion and configured to guide the transceiver module in a first attitude being inserted into the module accommodating portion, and when the transceiver module in
a second attitude inverted from the first attitude is inserted into the module accommodating portion, to restrict an insertion operation of the transceiver module,
wherein the housing of the transceiver module includes a terminal run off provided at an end portion opposed to the connector and is away from other contact terminals in the connector when the housing is connected to the connector.

4. The transceiver module assembly according to claim 3, wherein the terminal run off away from the contact terminals in the connector is located and recedes more largely away relative to the other contact terminals than a contact portion of the housing of the transceiver module adjacent to the terminal run off with which the stopper piece comes into contact is.

5. A plug connector for a transceiver module comprising:
a connection end having therein a concave portion forming an opening to which one end of a module board is inserted;
a plurality of contact terminals that are provided on the outer periphery face of the connection end and that are connected to electrode portions of the module board; and
a positioning portion that is formed in the concave portion of the connection end and that is engaged with a portion to be engaged of one end of the module board to thereby position the contact terminals to the electrode portions of the module board, wherein, both sides in the concave portion are outwardly opened such that both sides at the one end of the module board are not covered with the connection end, and wherein, the plug connector comprises at least a pair of crush ribs formed opposite to each other on an upper wall surface portion and a lower wall surface portion forming an upper portion and a lower portion of the concave portion of the connection end, and configured to nip the one end of the module board.

6. The plug connector for the transceiver module according to claim 5, wherein a distance between tips of the pair of crush ribs is set to (A−B−0.15) mm±0.1 mm where A is a thickness of the module board and B is a tolerance of the module board, respectively.

7. The plug connector for the transceiver module according to claim 5, further comprising:

at least a pair of crush ribs formed opposite to each other on each side wall surface portion forming both side portions of the concave portion of the connection end, and configured to nip the one end of the module board.

8. The plug connector for the transceiver module according to claim 7, wherein a distance between tips of the pair of crush ribs is set to (C−D−0.15) mm±0.1 mm where C is a lateral width of the module board and D is a tolerance of the module board, respectively.

\* \* \* \* \*